(12) United States Patent
Ideguchi

(10) Patent No.: US 8,379,052 B2
(45) Date of Patent: Feb. 19, 2013

(54) TWO-DIMENSIONAL CODE DISPLAY SYSTEM, TWO-DIMENSIONAL CODE DISPLAY METHOD, AND PROGRAM

(75) Inventor: Hiroshi Ideguchi, Tokyo (JP)

(73) Assignee: A.T Communications Co., Ltd., Tokyo (JP)

( * ) Notice: Subject to any disclaimer, the term of this patent is extended or adjusted under 35 U.S.C. 154(b) by 207 days.

(21) Appl. No.: 12/794,397

(22) Filed: Jun. 4, 2010

(65) Prior Publication Data

US 2010/0238187 A1    Sep. 23, 2010

Related U.S. Application Data

(62) Division of application No. 12/746,043, filed as application No. PCT/JP2008/069642 on Oct. 29, 2008.

(30) Foreign Application Priority Data

Dec. 4, 2007   (JP) ................................. 2007-313911
Dec. 21, 2007  (JP) ................................. 2007-331131
Jan. 29, 2008  (JP) ................................. 2008-018380

(51) Int. Cl.
*G09G 5/00* (2006.01)

(52) U.S. Cl. ... 345/619; 345/581; 345/629; 235/462.09; 235/462.11

(58) Field of Classification Search .......... None
See application file for complete search history.

(56) References Cited

U.S. PATENT DOCUMENTS

| 5,819,103 | A | 10/1998 | Endoh et al. |
| 6,747,671 | B1 | 6/2004 | Saito |
| 2004/0125053 | A1 | 7/2004 | Fujisawa |
| 2006/0071076 | A1 | 4/2006 | Tamayama |
| 2006/0086796 | A1 * | 4/2006 | Onogi ............................ 235/454 |
| 2006/0161871 | A1 | 7/2006 | Hotelling et al. |
| 2006/0262328 | A1 * | 11/2006 | Nose et al. ...................... 358/1.1 |
| 2007/0145141 | A1 * | 6/2007 | Ayatsuka ................... 235/462.1 |

FOREIGN PATENT DOCUMENTS

| DE | 10111970 A1 | 9/2002 |
| JP | 2004/295650 A | 10/2004 |
| WO | 2007/017767 A2 | 2/2007 |

OTHER PUBLICATIONS

European Search Report dated Apr. 19, 2011 issued in a corresponding European Patent Application No. 11001741.5.

European Search Report dated Apr. 20, 2011 issued in a corresponding European Patent Application No. 11001739.9.

(Continued)

*Primary Examiner* — Kee M Tung
*Assistant Examiner* — Jwalant Amin
(74) *Attorney, Agent, or Firm* — Sughrue Mion, PLLC

(57) ABSTRACT

A two-dimensional code display system has a display unit which can display a two-dimensional code representing predetermined information by plural cells arrange in a matrix, and a control unit which changes the display form of the two-dimensional code. For example, after 0.5 second has elapsed since the display unit starts displaying the image of a logo mark, the control unit controls the display unit to change the display from the image of the logo mark to a two-dimensional code. After 2.0 seconds has elapsed since the display unit starts displaying the two-dimensional code, the control unit controls the display unit to change the display from the two-dimensional code to the image of the logo mark. By repeating such control, the control unit can control the display unit to display alternately the image of the logo mark and the two-dimensional code.

10 Claims, 19 Drawing Sheets

OTHER PUBLICATIONS

European Search Report dated Apr. 26, 2011 issued in a corresponding European Patent Application No. 11001740.7.

European Communication dated Jan. 26, 2012 issued by the European Patent Office in counterpart European Patent Application No. 11001739.9.

European Communication dated Jan. 30, 2012 issued by the European Patent Office in counterpart European Patent Application No. 11001740.7.

* cited by examiner

FIG.8A

| TIMER ETERMINATION VALUE t | LAYER L1(t) |
|---|---|
| m * t7 | LAYER L1(0) |
| ⋮ | ⋮ |
| t1 + m * t7 | LAYER L1(t1) |
| ⋮ | ⋮ |

| TIMER ETERMINATION VALUE t | LAYER L2(t) |
|---|---|
| t2 + n * t6 | LAYER L2(t2) |
| ⋮ | ⋮ |
| t3 + n * t6 | LAYER L2(t3) |
| ⋮ | ⋮ |
| t4 + n * t6 | LAYER L2(t4) |
| ⋮ | ⋮ |
| t5 + n * t6 | LAYER L2(t5) |
| ⋮ | ⋮ |

| TIMER DETERMINATION VALUE t | IMAGE DATA P(t) | REMARK |
|---|---|---|
| t1 | P(t1) | ASPECT RATIO 1:1 |
| ⋮ | ⋮ | ⋮ |
| t1 + Δt | P(t1 + Δt) | ASPECT RATIO 1:1 |
| ⋮ | ⋮ | ⋮ |
| t2 | P(t2) | ASPECT RATIO r2:1 (1<r2<r3) |
| ⋮ | ⋮ | ⋮ |
| t3 | P(t3) | ASPECT RATIO r3:1 (r2<r3<1.33...) |
| ⋮ | ⋮ | ⋮ |
| t4 | P(t4) | ASPECT RATIO 1.33... :1 |
| ⋮ | ⋮ | ⋮ |
| t4 + Δt | P(t4 + Δt) | ASPECT RATIO 1.33... :1 |
| ⋮ | ⋮ | ⋮ |
| t5(= t1 + T) | P(t5) | ASPECT RATIO 1:1 |
| ⋮ | ⋮ | ⋮ |

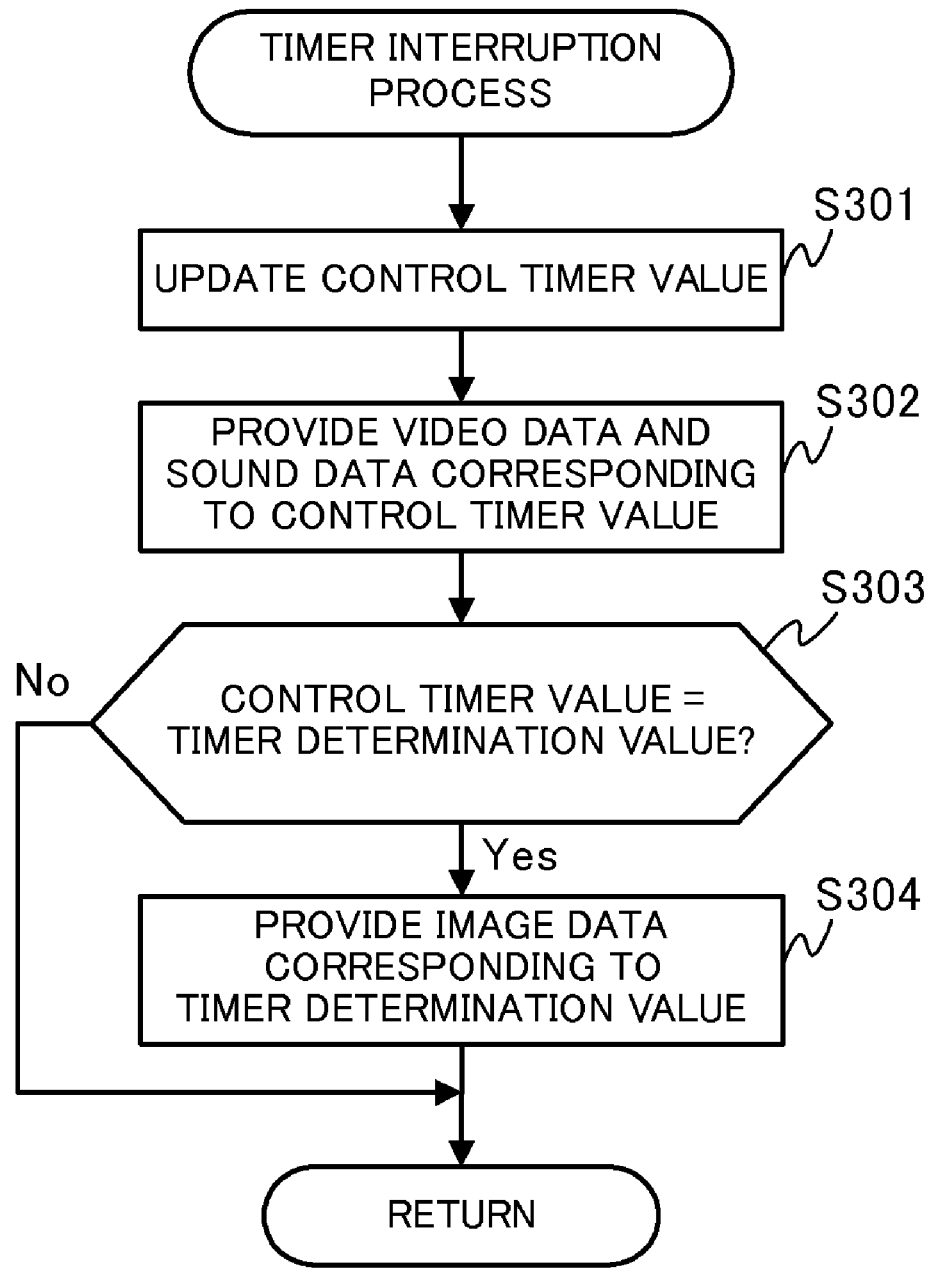

FIG.17A t=t1
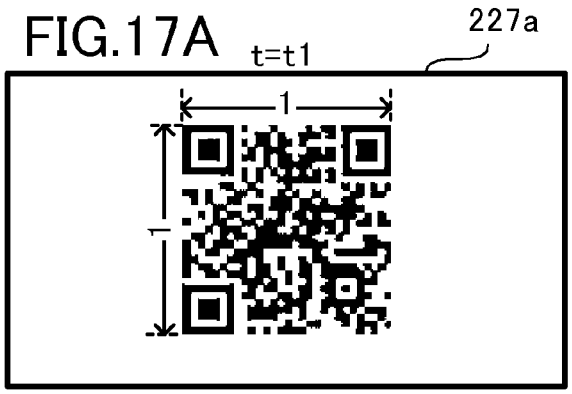
FIG.17E t=t1
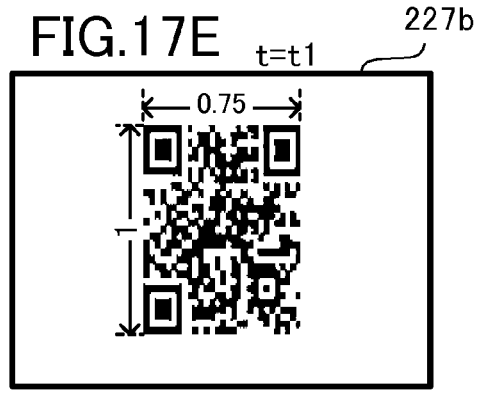
FIG.17B t=t2
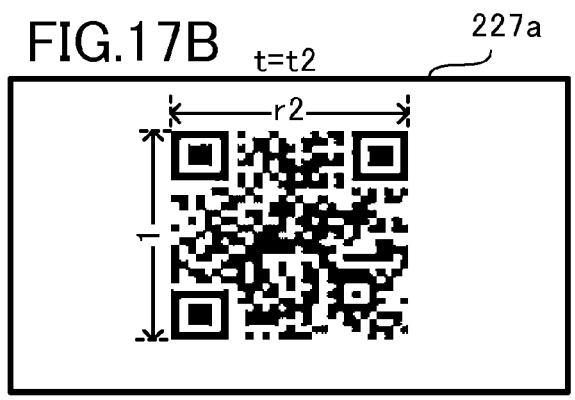
FIG.17F t=t2
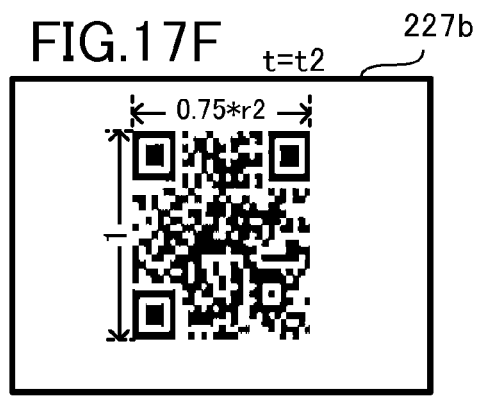
FIG.17C t=t3
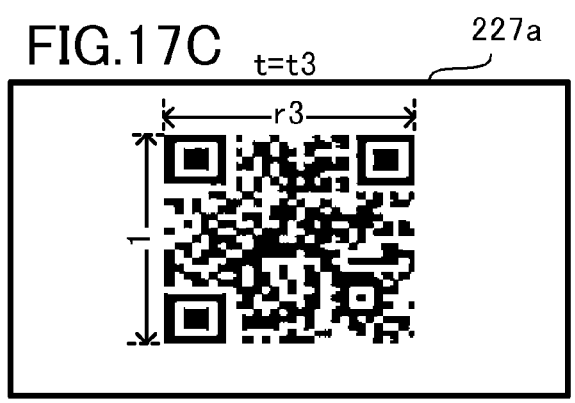
FIG.17G t=t3
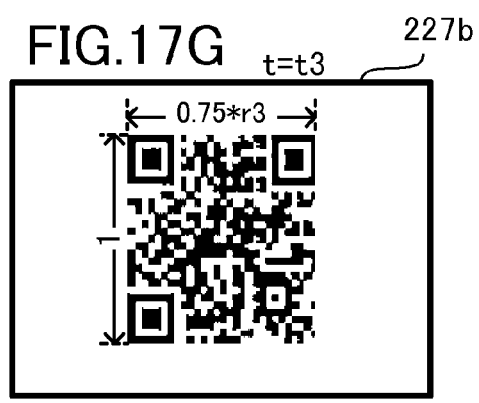
FIG.17D t=t4
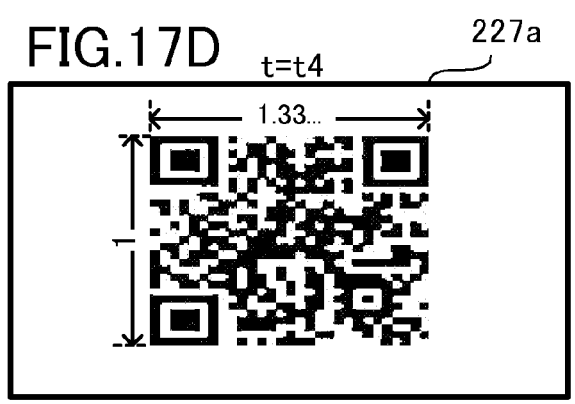
FIG.17H t=t4
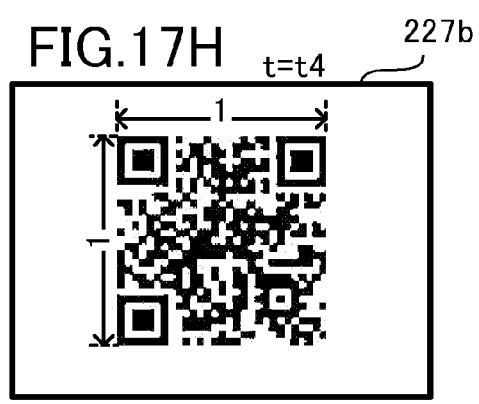

(α)   (β)

TWO-DIMENSIONAL CODE DISPLAY SYSTEM, TWO-DIMENSIONAL CODE DISPLAY METHOD, AND PROGRAM

CROSS REFERENCE TO RELATED APPLICATION

This application is a Divisional of application Ser. No. 12/746,043 filed Jun. 3, 2010 which is a 371 National Stage Entry of PCT/JP2008/069642, filed Oct. 29, 2008 which is based on Japanese Patent Applications No. 2007-313911 filed on Dec. 4, 2007, No. 2007-331131 filed on Dec. 21, 2007 and No. 2008-18380 filed on Jan. 29, 2008, the disclosures of which are incorporated herein by reference in their entirety.

TECHNICAL FIELD

The present invention relates to a two-dimensional code display system, a two-dimensional code display method, and a program.

BACKGROUND ART

Two-dimensional codes which represent information by two-toned cells arranged in a vertical direction and a horizontal direction (like a matrix) into white or black can handle a large amount of information in comparison with a one-dimensional bar-code, and are used in various scenes in a daily life. Regarding display of such two-dimensional codes, there have been proposed various technologies (see, for example, Patent Literature 1).

A logo-added two-dimensional code disclosed in Patent Literature 1 is a two-dimensional code combined with a logo mark, and can simultaneously represent digital information and visual information.

Patent Literature 1: Unexamined Japanese Patent Application KOKAI Publication No. 2007-287004

DISCLOSURE OF INVENTION

Problem to be Solved by the Invention

According to such kind of the technology, however, when a logo mark or the like is additionally displayed, it is necessary to deteriorate the design characteristic of the logo mark or the like to some level in order to ensure the readability of a two-dimensional code. Moreover, it is hard to say that a two-dimensional code display technology which can appropriately cope with a user environment from the standpoint of reading a two-dimensional code is well established, and there is a necessity to further improve the readability of a two-dimensional code.

The present invention has been made in view of the foregoing circumstance, and it is an object of the present invention to provide a two-dimensional code display system, a two-dimensional code display method, and a program which can improve a design characteristic and readability.

Means for Solving the Problem

To achieve the object, a two-dimensional code display system of the present invention comprises:
display means which is capable of displaying a two-dimensional code representing predetermined information by plurality of cells arranged in a matrix; and
display control means for changing a display form of the two-dimensional code.

Moreover, a two-dimensional code display method of the present invention is a two-dimensional code display method for controlling a display means to display a two-dimensional code representing predetermined information by plurality of cells arranged in a matrix, the method comprising:
a display control step of changing a display form of the two-dimensional code.

A program of the present invention allows a computer to function as:
display control means for changing a display form of a two-dimensional code representing predetermined information when display means is controlled to display the two-dimensional code by plurality of cells arranged in a matrix.

(In the display control step) the display control means may control the display means to intermittently display the two-dimensional code, and controls the display means to display a predetermined image while the two-dimensional code is not displayed.

In this case, (in the display control step) the display control means may repeat a control of changing the display of the display means to the two-dimensional code after a first period elapses since the display means starts displaying the predetermined image, and a control of changing the display of the display means to the predetermined image after a second period elapses since the display means starts displaying the two-dimensional code.

The display means may be capable of displaying a synthesis image of a predetermined image and the two-dimensional code; and
(in the display control step) the display control means may control the display means to display the synthesis image while changing a proportion of a colored pattern contained in the cell.

In this case, (in the display control step) the display control means may allow the two-dimensional code to represent the predetermined information by gradually increasing the proportion of the colored pattern after a first period elapses since the display means starts displaying the predetermined image.

(In the display control step) the display control means may cause the two-dimensional code not to represent the predetermined information by gradually decreasing the proportion of the colored pattern after a second period elapses since the proportion of the colored pattern becomes the maximum.

(In the display control step) the display control means may control the display means to display the synthesis image while changing the proportion of the colored pattern by sequentially changing and displaying plural kinds of two-dimensional codes each having a different proportion of the colored pattern.

(In the display control step) the display control means may control the display means to display the synthesis image while changing a shape of the colored pattern.

(In the display control step) the display control means may gradually change an aspect ratio of the two-dimensional code which the display means is controlled to display thereon.

(In the display control step) the display control means may gradually change a size of the two-dimensional code which the display means is controlled to display thereon.

(In the display control step) the display control means controls the display means to sequentially change and display plural kinds of two-dimensional codes each representing information having a different content.

Effect of the Invention

According to the present invention, there are provided a two-dimensional code display device, a two-dimensional code display method and a program which can display an image having a good design characteristic without deteriorating the readability thereof.

Moreover, according to the present invention, there are provided a two-dimensional code display system, a two-dimensional code display method, and a program which can visibly display a two-dimensional code regardless of the aspect ratio of a display screen and the size thereof.

BRIEF DESCRIPTION OF DRAWINGS

FIG. 8A is a diagram showing the example structure of an image display control table, and FIG. 8B is a diagram showing the example structure of a two-dimensional code display control table;

FIG. 14 is a diagram showing the example structure of data stored in a memory unit in FIG. 13;

FIG. 16 is a flowchart showing an example of a timer interruption process executed by the transmission device;

FIGS. 17A to 17H are diagrams showing image display examples of a two-dimensional code displayed by the reception device;

EXPLANATION OF REFERENCE NUMERALS

Figure 1:
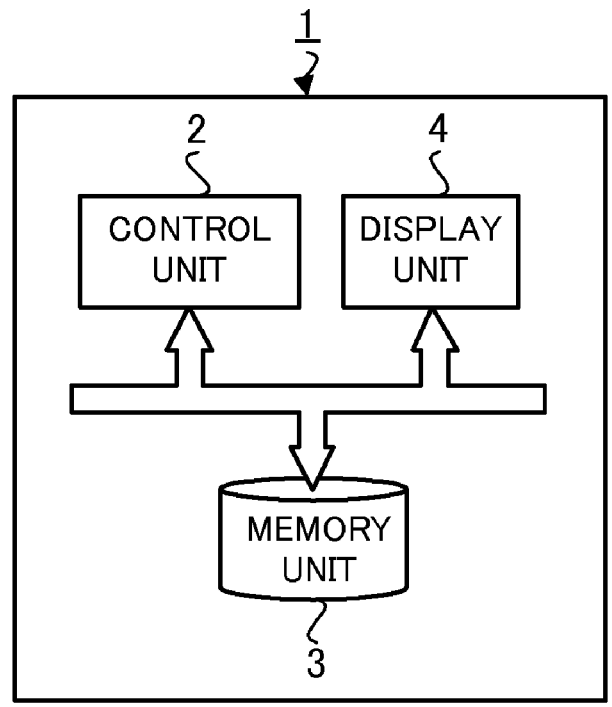
FIG. 1 is a block diagram showing the example structure of a two-dimensional code display system according to the first embodiment of the present invention.

1, 10 Two-dimensional code display system
2, 11 Control unit
3, 12 Memory unit
4, 13 Display unit
5*a* to 5*c* Positioning symbol
6 Logo mark
15 Character
20 Television broadcasting system
21 Transmission device
22*a*, 22*b* Reception device
121 Image display control table
122 Two-dimensional code display control table
200, 220*a*, 220*b* Control unit
201 Memory unit
202 Synthesis unit
203 Encoder unit
204 Multiplexer unit
205 Modulation unit
206, 221*a*, 221*b* Antenna
210 Image encoder
211 Sound encoder
222*a*, 222*b* Tuner unit
223*a*, 223*b* Demodulation unit
224*a*, 224*b* De-multiplexer unit
225*a*, 225*b* Decoder unit
226*a*, 226*b* Processing unit
227*a*, 227*b* Display unit
228*a*, 228*b* Speaker
230*a*, 230*b* Image decoder
231*a*, 231*b* Sound decoder
232*a*, 232*b* Image processing unit
233*a*, 233*b* Sound processing unit

BEST MODE FOR CARRYING OUT THE INVENTION

An explanation will be given of the best mode for carrying out the present invention.

First Embodiment

First, an explanation will be given of a two-dimensional code display system of the first embodiment with reference to the accompanying drawings. A two-dimensional code display system 1 comprises, for example, a general-purpose computer or a mobile communication device like a cellular phone. As shown in FIG. 1, the two-dimensional code display system 1 has a control unit 2, a memory unit 3, and a display unit 4, and those units are connected together via a bus or the like.

The control unit 2 comprises, for example, a CPU (Central Processing Unit), a ROM (Read Only Memory), a RAM (Random Access Memory), and the like. The CPU uses the RAM as a work memory, and appropriately executes various programs stored in the ROM, the memory unit 3, or the like, thereby controlling the operations of the individual units of the two-dimensional code display system 1. In the embodiment, the RAM stores a display period timer for counting the display period of an image or a two-dimensional code.

The memory unit 3 comprises, for example, a hard disk drive or the like, and stores an OS (Operating System), various application programs, image data, a two-dimensional code, and the like. In the embodiment, the memory unit 3 stores a two-dimensional code display program which alternately displays an image based on image data and a two-dimensional code on the display unit 4.

Figure 2:
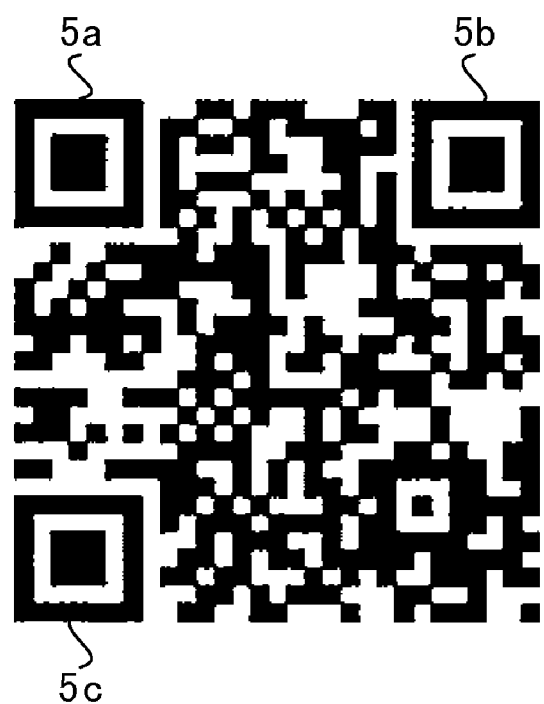
FIG. 2 is a top plan view showing an example of a two-dimensional code.

FIG. 2 is a top plan view showing an example of a two-dimensional code. As shown in FIG. 2, a two-dimensional code employs a structure such that, for example, a plurality of square cells each having a size of 4 mm by 4 mm are arranged in a vertical direction and a horizontal direction like a matrix 21 cells by 21 cells. The two-dimensional code has three positioning symbols 5a, 5b, and 5c. The two-dimensional code has two-toned cells (in black and white) which represent, for example, a URL (Uniform Resource Locator) or the like.

Figure 3:
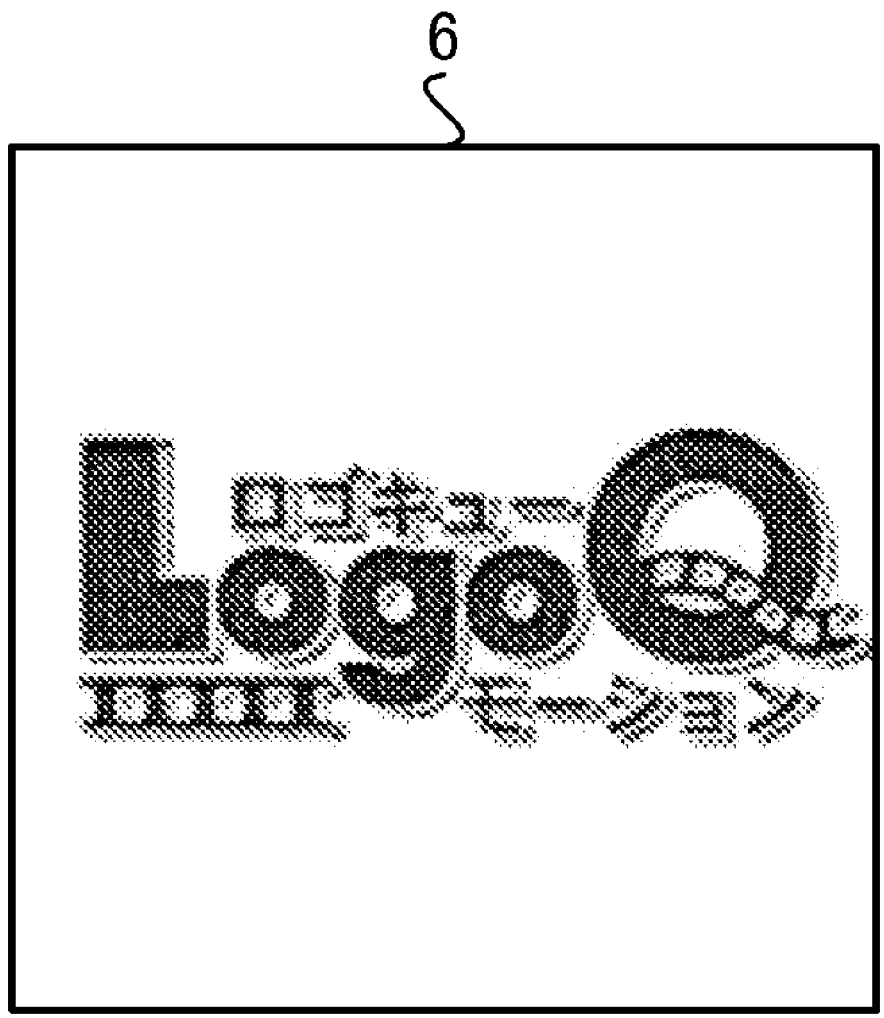
FIG. 3 is a top plan view showing an example of a logo mark.

FIG. 3 is a top plan view showing an example of an image based on image data stored in the memory unit 3. In the embodiment, as shown in FIG. 3, an image which is alternately displayed with a two-dimensional code visibly represents a logo mark 6 or the like corresponding to information (e.g., http://www.a-tc.jp) represented by a two-dimensional code.

The display unit 4 comprises, for example, an LCD (Liquid Crystal Display) or the like, and displays a user interface screen for allowing the two-dimensional code display system 1 to perform various operations under the control of the control unit 2, as well as an image of the logo mark 6 based on the image data, a two-dimensional code, and the like that are stored in the memory unit 3.

Next, an explanation will be given of the specific operation of the two-dimensional code display system 1 having the foregoing structure with reference to the accompanying drawings.

Figure 4:
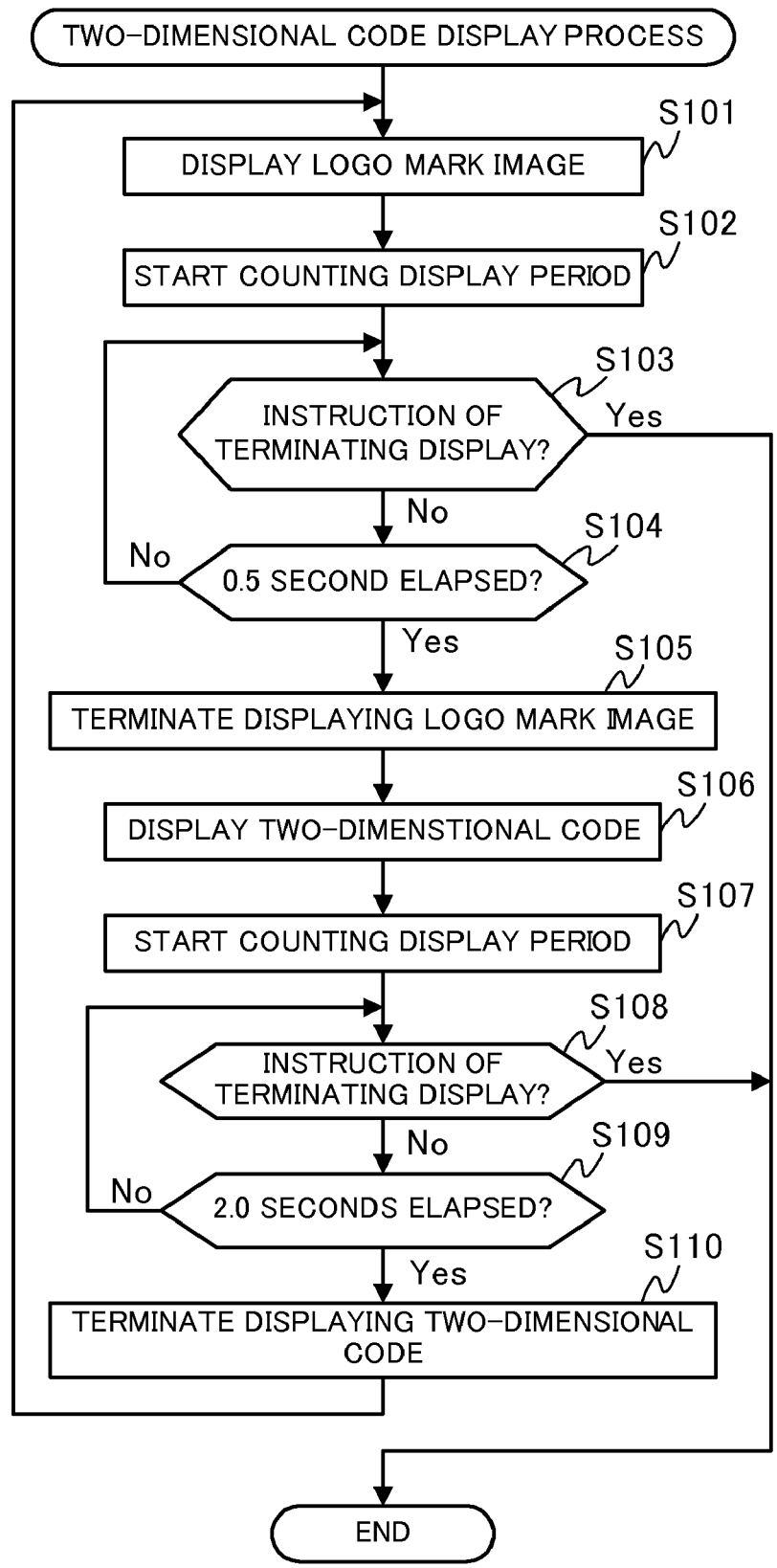
FIG. 4 is a flowchart showing an example of a two-dimensional code display process executed by the two-dimensional code display system of the first embodiment.

For example, as the user operates the two-dimensional code display system 1 to input an instruction of starting displaying of a two-dimensional code, the control unit 2 activates the two-dimensional code display program stored in the memory unit 3 in response to the instruction. Accordingly, a two-dimensional code display process shown in FIG. 4 is started.

Figure 5:
FIG. 5 is a top plan view showing an example of a displayed image by the two-dimensional code display system of the first embodiment.

As the two-dimensional code display process is started, first, the control unit 2 reads out image data stored in the memory unit 3, and as shown in FIG. 5, causes the display unit 4 to display the image of the logo mark 6 based on the image data together with the positioning symbols 5a, 5b, and 5c (step S101). Moreover, the control unit 2 sets a timer initial value corresponding to, for example, 0.5 second to the display period timer provided in the RAM, starts countdown of the display period timer, thereby starting counting of the display period of the image of the logo mark 6 (step S102).

Next, the control unit 2 determines whether or not an instruction of terminating displaying of the two-dimensional code is input as the user operates the two-dimensional code display system 1 (step S103). When the instruction of terminating displaying of the two-dimensional code is input (step S103: YES), the control unit 2 terminates the two-dimensional code display process.

Conversely, when the instruction of terminating displaying of the two-dimensional code is not input (step S103: NO), the control unit 2 determines whether or not 0.5 second have elapsed since the image of the logo mark 6 is displayed by checking whether or not the timer value of the display period timer becomes "0" (step S104). When the timer value of the display period timer is a value other than "0" (step S104: NO), the control unit 2 determines that 0.5 second have not elapsed since the image of the logo mark 6 is displayed, and continues displaying the image of the logo mark 6, and waits until 0.5 second have elapsed by looping.

Thereafter, as the timer value of the display period timer becomes "0" and the control unit 2 determines that 0.5 second have elapsed since the image of the logo mark 6 is displayed (step S104: YES), and the control unit 2 once terminates displaying of the image of the logo mark 6 (step S105). Next, the control unit 2 reads out a two-dimensional code stored in the memory unit 3 and displays the two-dimensional code on the display unit 4 (step S106), thereby changing the display of the display unit 4 from the image of the logo mark 6 to the two-dimensional code. While at the same time, the control unit 2 sets a timer initial value corresponding to, for example, 2.0 seconds to the display period timer, and starts countdown of the display period timer, thereby starting counting of the display period of the two-dimensional code (step S107).

Subsequently, the control unit 2 determines whether or not an instruction of terminating displaying of the two-dimensional code is input as the user operates the two-dimensional code display system 1 (step S108). When the instruction of terminating displaying of the two-dimensional code is input (step S108: YES), the control unit 2 terminates the two-dimensional code display process.

Conversely, when the instruction of terminating displaying of the two-dimensional code is not input (step S108: NO), the control unit 2 determines whether or not 2.0 seconds have elapsed by checking whether or not the timer value of the display period timer becomes "0" (step S109). When the timer value of the display period timer is a value other than "0" (step S109: NO), the control unit 2 determines that 2.0 seconds have not elapsed since the two-dimensional code is displayed, continues displaying of the two-dimensional code, and waits until 2.0 seconds have elapsed by looping.

Thereafter, as the timer value of the display period timer becomes "0" and the control unit 2 determines that 2.0 seconds have elapsed since the two-dimensional code is displayed (step S109: YES), the control unit 2 once terminates display of the two-dimensional code (step S110). Next, the control unit 2 returns the process to the step S101, and displays the image of the logo mark 6 based on the image data on the display unit 4, thereby changing the display of the display unit 4 from the two-dimensional code to the image of the logo mark 6.

By repeating such a process, the display unit 4 alternately displays the image of the logo mark 6 shown in FIG. 5 and the two-dimensional code shown in FIG. 2. Moreover, by setting the display period of the image of the logo mark 6 and the display period of the two-dimensional code to 0.5 second and 2.0 seconds, respectively, a user can read information from the two-dimensional code, while at the same time, can view the image of the logo mark 6.

As explained above, according to the two-dimensional code display system 1 of the embodiment, the control unit 2 performs a controlling of changing the display of the display unit 4 from the image of the logo mark 6 to the two-dimensional code after 0.5 second have elapsed since the image of the logo mark 6 is displayed on the display unit 4. The control unit 2 performs a controlling of changing the display of the display unit 4 from the two-dimensional code to the image of the logo mark 6 after 2.0 seconds have elapsed since the two-dimensional code is displayed on the display unit 4. By repeating such controlling, the control unit 2 can alternately display the image of the logo mark 6 shown in FIG. 5 and the two-dimensional code shown in FIG. 2 on the display unit 4.

Accordingly, the two-dimensional code display system 1 can display the image of the logo mark 6 having a good design characteristic without deteriorating the readability of the two-dimensional code.

Second Embodiment

Figure 6:
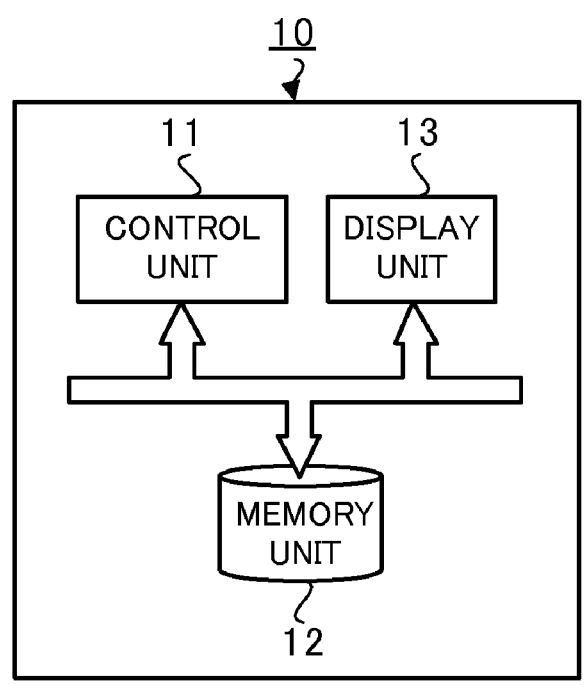
FIG. 6 is a block diagram showing the example structure of a two-dimensional code display system according to the second embodiment of the present invention.

Next, by referring to drawings, an explanation will be given of a two-dimensional code display system according to the second embodiment of the present invention. A two-dimensional code display system 10 of the second embodiment has the similar hardware structure to the two-dimensional code displays system 1 (see FIG. 1) of the first embodiment, and as shown in FIG. 6, has a control unit 11, a memory unit 12, and a display unit 13, and those units are connected together via a bus or the like.

The control unit 11 comprises, for example, a CPU, a ROM, a RAM, a CTC (Counter/Timer Circuit), and the like. Every time an interruption request signal is input from the CTC, the CPU appropriately executes various programs stored in the ROM, the memory unit 12, or the like by using the RAM as a work memory, thereby controlling operations of the individual units of the two-dimensional code display system 10.

In the embodiment, the RAM stores a display flag indicating that an image based on image data, and a two-dimensional code are displayed on the display unit 13, and a display control timer used when controlling the display of the display unit 13.

The memory unit 12 comprises, for example, a hard disk drive or the like, and stores an OS, various application programs, various control tables, image data, a two-dimensional code, etc.

In the embodiment, the memory unit 12 stores plural pieces of image data indicating respective plural kinds of still images constituting a motion image with a layer structure that the plural pieces of image data are stacked in the reproduction order from the bottom layer to the top layer. The layer structure is optional, and for example, plural pieces of image data indicating respective plural kinds of still images constituting a motion image may be stacked in the reproduction order of the motion image from the top layer to the bottom layer.

Figure 7:
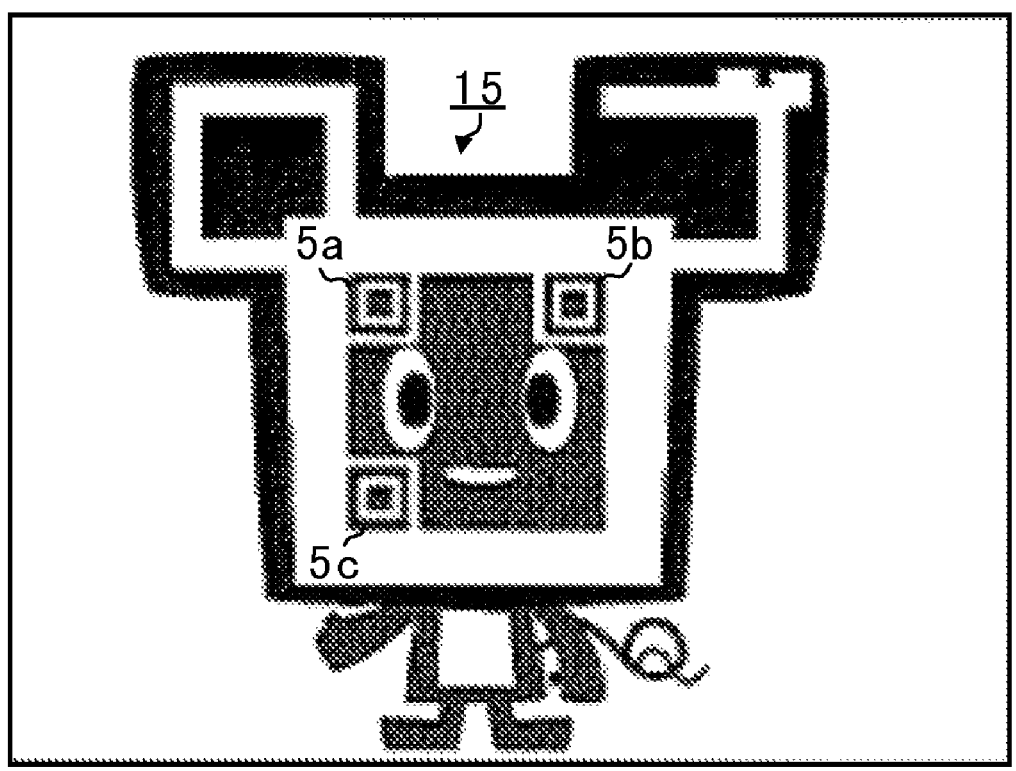
FIG. 7 is a top plan view showing an example of a still image based on image data.

As shown in FIG. 7, an image represented by such image data visibly represents a character 15 having three positioning symbols 5a, 5b, and 5c placed on the face thereof. The facial expressions of the character 15 and the positions of the hands and legs thereof on one still image differ from those on another still image.

The memory unit 12 shown in FIG. 6 stores plural kinds of two-dimensional codes each having a different colored pattern of the cell, size and shape thereof with a layer structure that the two-dimensional codes are stacked in a predetermined order from the bottom layer to the top layer.

Such two-dimensional codes are created by changing the colored pattern of the cell constituting the two-dimensional code shown in FIG. 2, and the size (i.e., a proportion of colored pattern contained in a cell) thereof.

In the embodiment, the memory unit 12 stores plural kinds of two-dimensional codes with circular colored patterns having a different diameter, and two-dimensional codes having colored patterns patterned in an X-like shape, a cross-like shape, with a layer structure that the two-dimensional codes are stacked together. Note that the shape of a colored pattern is optional, and for example, may be a rectangle similar to a cell, a triangle, a hexagon, a diamond shape, a star, a heart, or the like, or, may be an infinite form.

The memory unit 12 shown in FIG. 6 stores an image display control table 121 shown in FIG. 8A, a two-dimensional code display control table 122 shown in FIG. 8B, and the like as control tables which are referred to when the displaying of the display unit 13 is controlled.

As shown in FIG. 8A and FIG. 8B, a timer determination value indicating a change timing of an image and a two-dimensional code and a layer where image data indicating an image to be displayed on the display unit 13 and a two-dimensional code are arranged are registered in the image display control table 121 and the two-dimensional code display control table 122 in association with each other. Note that letters m and n in the figure are integers greater than or equal to 0.

The memory unit 12 shown in FIG. 6 stores a two-dimensional code display program as one of various application programs. In accordance with the two-dimensional code display program, the control unit 11 executes a two-dimensional code display process. In the two-dimensional code display process, the control unit 11 displays an image based on image data and a two-dimensional code on the display unit 13 superimposed with each other, and sequentially changes such an image and a two-dimensional code correspondingly to the updating of a timer value of the display control timer.

The display unit 13 comprises, for example, an LCD (Liquid Crystal Display) or the like, and displays a user interface screen for allowing the two-dimensional code display system 10 to perform various operations under the control of the control unit 11, as well as an image based on image data, a two-dimensional code, and the like that are stored in the memory unit 12.

Next, an explanation will be given of the specific operation of the two-dimensional code display system 10 having the foregoing structure with reference to accompanying drawings.

As the CPU of the control unit 11 receives an interruption request signal which is output from the CTC for each predetermined period (e.g., 33 ms) and receives an interruption request, the CPU executes a predetermined timer interruption process. In the timer interruption process, as the CPU of the control unit 11 runs the two-dimensional code display program, a two-dimensional code display process shown in FIG. 9 is executed.

Figure 9:
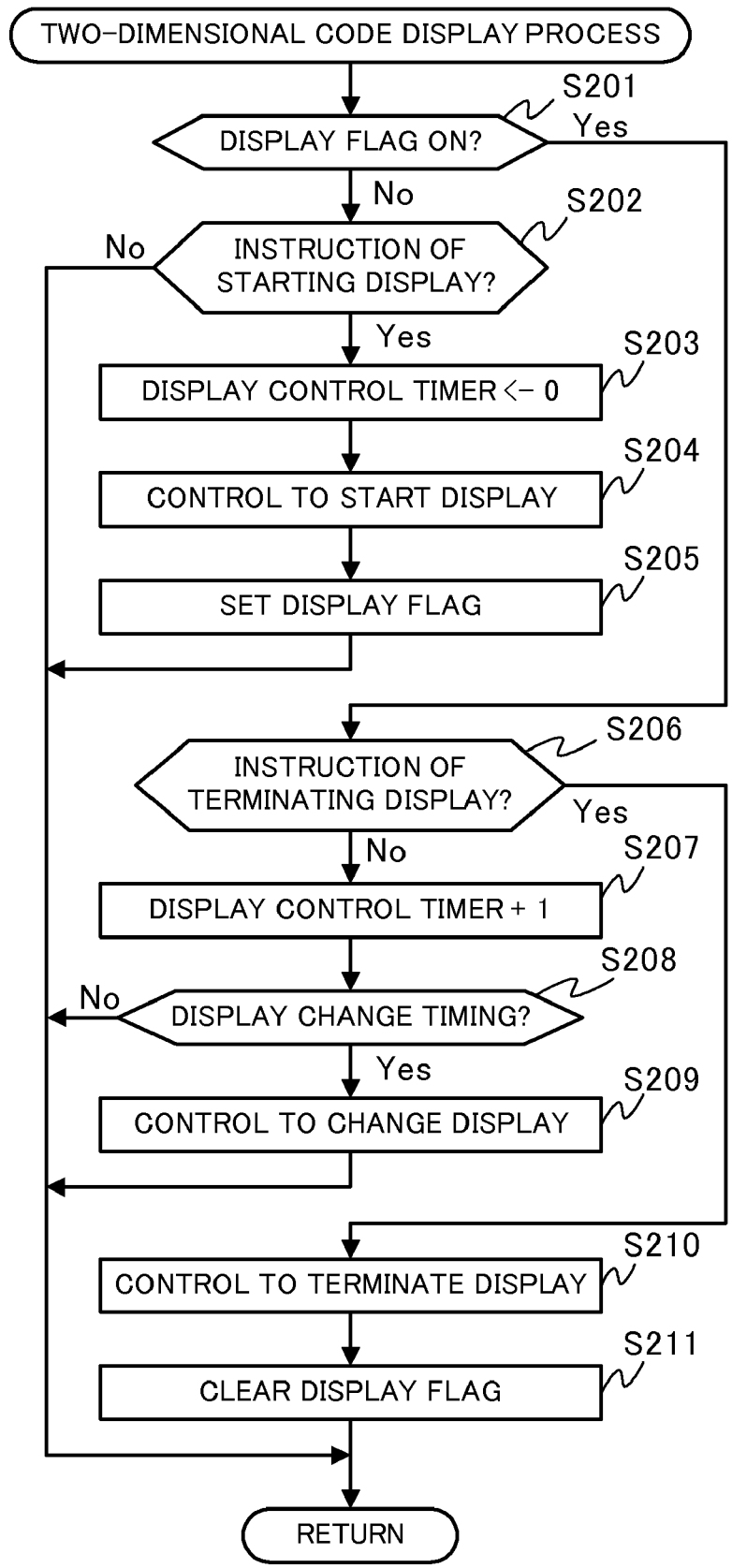
FIG. 9 is a flowchart showing an example of a two-dimensional code display process executed by the two-dimensional code display system of the second embodiment.

In the two-dimensional code display process, first, as shown in FIG. 9, the CPU determines whether or not the display flag provided in the RAM is ON (step S201). When the display flag is OFF (step S201: NO), the CPU determines whether or not an instruction of starting displaying of a two-dimensional code is input as the user operates the two-dimensional code display system 10 (step S202).

When determining in the step S202 that no instruction of starting displaying of a two-dimensional code is input (step S202: NO), the CPU directly terminates the two-dimensional code display process. Conversely, when determining that an instruction of starting displaying of a two-dimensional code is input (step S202: YES), the CPU sets a timer initial value "0" to the display control timer provided in the RAM (step S203).

Subsequently, the CPU refers to the image display control table 121 or the like shown in FIG. 8A, and controls the display unit 13 to display an image based on image data arranged in a layer corresponding to the timer initial value "0" set in the step S203, i.e., the lowest layer (step S204).

Note that since a layer corresponding to the timer initial value "0" is not registered in the two-dimensional code display control table 122 shown in FIG. 8B, a control which causes the display unit 13 to display a two-dimensional code is not carried out in the step S204.

Thereafter, the CPU sets the display flag to be ON (step S205), and terminates the two-dimensional code display process.

Conversely, when determining that the display flag is ON in the step S201 (step S201: YES), the CPU determines whether or not an instruction of terminating displaying of a two-dimensional code is input as the user operates the two-dimensional code display system 10 (step S206).

When determining in the step S206 that no instruction of terminating displaying of a two-dimensional code is input (step S206: NO), the CPU updates the timer value of the display control timer provided in the RAM by, for example, incrementing such value (step S207).

Next, the CPU detects a timer determination value matching the timer value updated in the step S207 from the image display control table 121 shown in FIG. 8A or the two-dimensional code display control table 122 shown in FIG. 8B, thereby determining whether or not it becomes a timing (change timing) to change an image or a two-dimensional code displayed on the display unit 13 (step S208).

When it has become the change timing (step S208: YES), the CPU causes the display unit 13 to display an image based on image data or a two-dimensional code arranged in a layer corresponding to the timer value detected in the step S208 instead of a current display content (step S209), and terminates the two-dimensional code display process.

More specifically, when a timer determination value matching the updated timer value is detected only from the image display control table 121 shown in FIG. 8A but is not detected from the two-dimensional code display control table 122 shown in FIG. 8B in the step S208, only the image displayed on the display unit 13 is changed but the display of the two-dimensional code is not changed in the step S209.

Conversely, when a timer determination value matching the updated timer value is detected only from the two-dimensional code display control table 122 shown in FIG. 8B but is not detected from the image display control table 121 shown in FIG. 8A in the step S208, only the two-dimensional code displayed on the display unit 13 is changed but the display of the image is not changed.

Further, when a timer determination value matching the updated timer value is detected from both image display control table 121 shown in FIG. 8A and two-dimensional code display control table 122 shown in FIG. 8B in the step S208, both image and two-dimensional code displayed on the display unit 13 are changed.

When determining in the step S208 that it has not become the change timing (step S208: NO), the image and the two-dimensional code both displayed on the display unit 13 are not changed, and the CPU terminates the two-dimensional code display process. More specifically, when a timer determination value matching the updated timer value is not detected from both of the image display control table 121 and the two-dimensional code display control table 122, the CPU determines that it is not the change timing.

When determining in the step S206 that an instruction of terminating displaying of the two-dimensional code is input (step S206: YES), the CPU controls the display unit 13 to terminate displaying of the image and the two-dimensional code (step S210), and clears the display flag to set it to be OFF (step S211), and terminates the two-dimensional code display process.

Next, the two-dimensional code display process will be explained in more detail with reference to accompanying drawings.

Figure 10A:
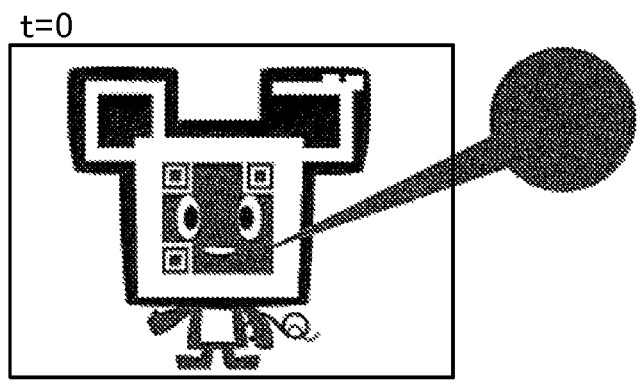
FIGS. 10A to 10D are timing charts for explaining the two-dimensional code display process in FIG. 9.

For example, as a user inputs an instruction of starting displaying of a two-dimensional code at a timing t=0 (step S202: YES), the CPU of the control unit 11 sets a timer initial value "0" to the display control timer (step S202). The CPU of the control unit 11 causes the display unit 13 to display only an image visibly representing the character 15 shown in FIG. 10A based on image data arranged in the lowest layer corresponding to the timer initial value (step S204).

Figure 10B:
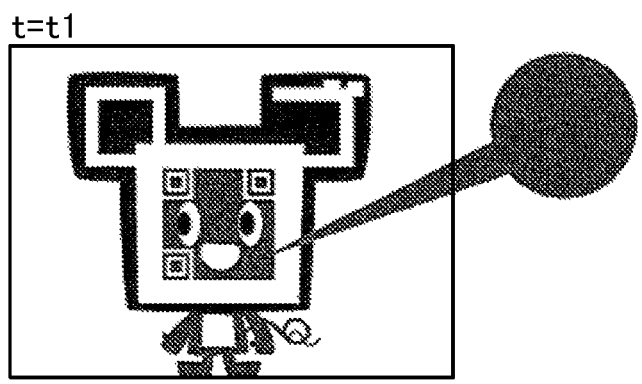

Thereafter, every time a timer value of the display control timer matches a timer determination value registered in the image display control table 121 (step S208: YES), the CPU performs a display-change control (step S209). More specifically, the CPU gradually changes an image displayed on the display unit 13 to a still image based on image data arranged in an upper layer, thereby causing the display unit 13 to display a motion image of the character 15. For example, at a timing t=t1, as shown in FIG. 10B, an image displayed on the display unit 13 is changed to a still image based on image data arranged in a layer L1(t1).

Figure 10C:
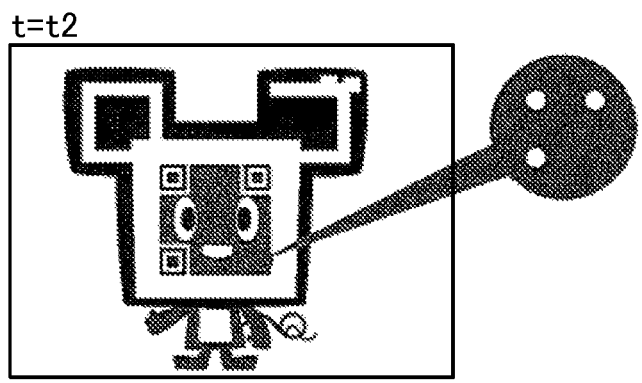

When it becomes a timing t=t2, a timer value becomes matching a timer determination value registered in the two-dimensional code display control table 122 shown in FIG. 8B (step S208: YES), a synthesis image of a motion image of the character 15 with a two-dimensional code is displayed in the step S209. At this timing t=t2, as shown in FIG. 10C, a synthesis image of the motion image of the character 15 with the two-dimensional code having colored patterns, each of which is formed to have its smallest diameter, and arranged in a layer L2(t2) is displayed on the display unit 13.

Thereafter, every time a timer value of the display control timer becomes matching a timer determination value registered in the two-dimensional code display control table 122 shown in FIG. 8B (step S208: YES), the CPU gradually changes a two-dimensional code to be displayed on the display unit 13 to a two-dimensional code arranged in an upper layer in the step S209. Accordingly, the size of each of the colored patterns formed in the two-dimensional code gradually becomes large. When the size of each of the colored patterns becomes a predetermined size, it becomes possible for the user to read information from the two-dimensional code displayed on the display unit 13 using a predetermined two-dimensional code reader.

Figure 10D:
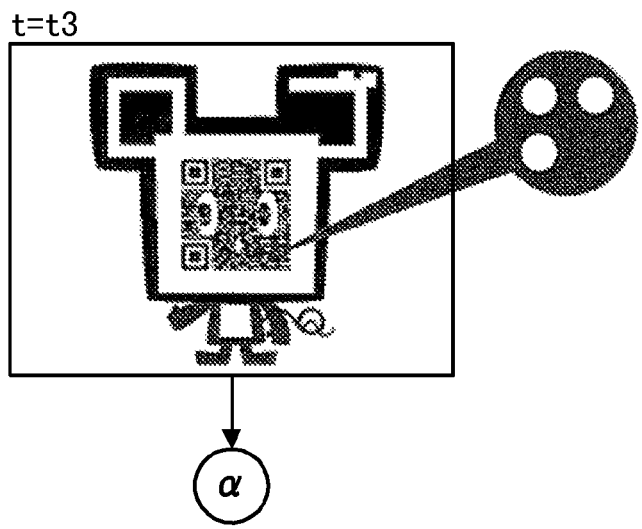

Further, when it becomes a timing t=t3, the CPU changes the two-dimensional code displayed on the display unit 13 to a two-dimensional code arranged in a layer L2(t3) in the step S209. Accordingly, as shown in FIG. 10D, a synthesis image of a motion image of the character 15 with a two-dimensional code having circular colored patterns, each of which is formed to have its largest diameter, is displayed on the display unit 13. Thereafter, for about one second, changing of a two-dimensional code configuring a synthesis image displayed on the display unit 13 is not carried out.

Figure 11A:
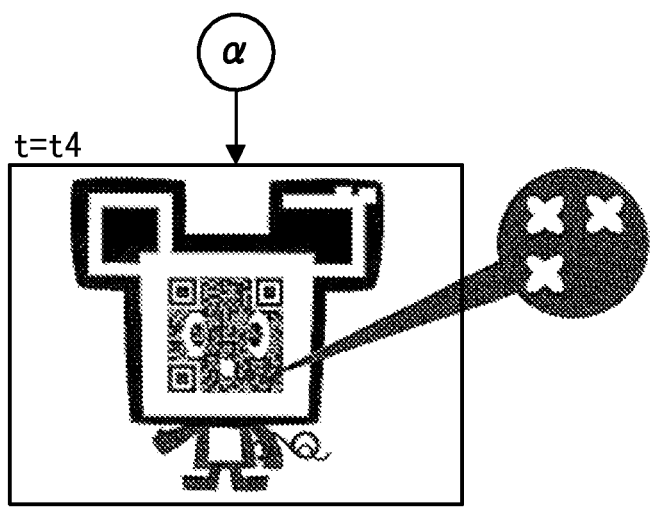
FIGS. 11A to 11D are timing charts for explaining the two-dimensional code display process in FIG. 9.

When it becomes a timing t=t4, the CPU changes the two-dimensional code displayed on the display unit 13 to a two-dimensional code arranged in a layer L2(t4) in the step S209. Accordingly, as shown in FIG. 11A, the shape of the colored patterns formed in the two-dimensional code configuring a synthesis image displayed on the display unit 13 becomes an X-like shape.

Figure 11B:
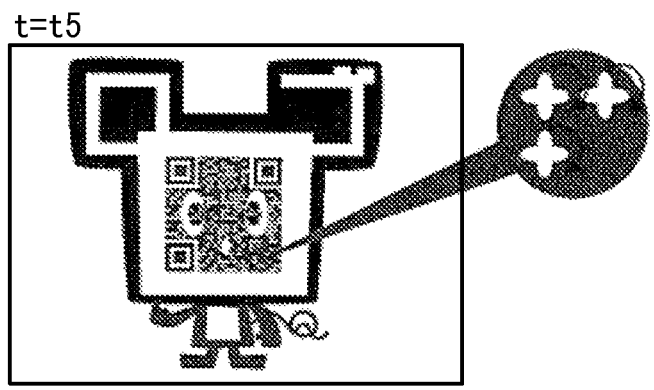

Thereafter, every time a timer value of the display control timer becomes matching a timer determination value registered in the two-dimensional code display control table 122 shown in FIG. 8B (step S208: YES), the CPU gradually changes the two-dimensional code displayed on the display unit 13 to a two-dimensional code arranged in an upper layer in the step S209. Next, at a timing t=t5, as shown in FIG. 11B, the CPU changes the shape of the colored patterns of the two-dimensional code displayed on the display unit 13 to a cross-like shape, thereby displaying the synthesis image as if the colored patterns are rotating.

Thereafter, every time a timer value of the display control timer becomes matching a timer determination value registered in the two-dimensional code display control table 122 shown in FIG. 8B (step S208: YES), the CPU gradually changes the two-dimensional code displayed on the display unit 13 to a two-dimensional code arranged in an upper layer, thereby causing the size of the colored patterns of the two-dimensional code to gradually decrease.

Figure 11C:
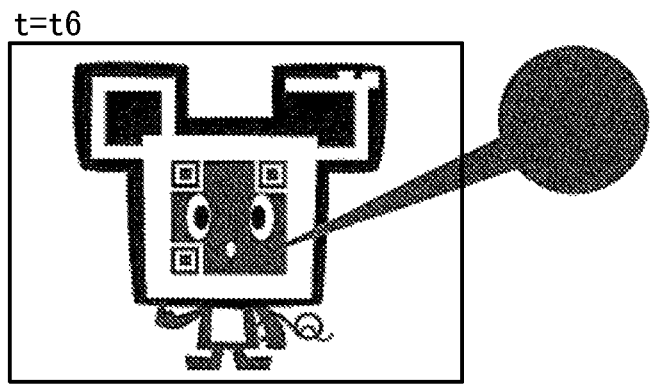

When it becomes a timing t=t6, a timer value of the display control timer becomes not matching a timer determination value registered in the two-dimensional code display control table 122 shown in FIG. 8B (step S208: NO), the CPU terminates the two-dimensional code display process, and as shown in FIG. 11C, displays only a motion image of the character 15 on the display unit 13.

Note that when it becomes a timing t=t7, a timer value of the display control timer becomes matching the initial timer determination value registered in the image display control table 121 shown in FIG. 8A (step S208: YES), the display of the display unit 13 returns to an image shown in FIG. 10A.

Figure 11D:
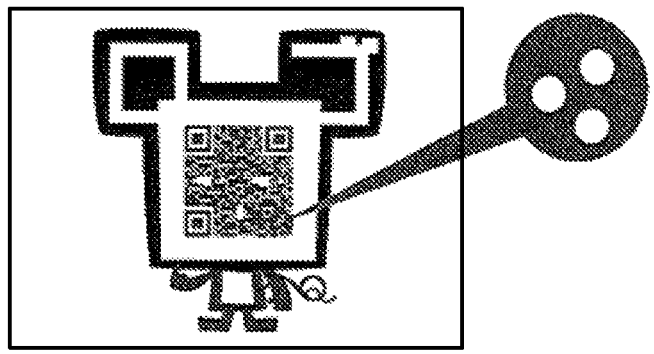

A two-dimensional code displayed on the display unit 13 during a period from the timing t=t6 to a timing t=t2+t6 may be changed to a two-dimensional code having different information. This allows the CPU to display a synthesis image having the same motion image of the character 15 but having different information represented by a two-dimensional code as shown in FIG. 11D on the display unit 13 during a period after a timing t=t2+t6.

As explained above, according to the two-dimensional code display system 10 of the second embodiment, every time a timer value of the display control timer becomes matching a timer determination value registered in the two-dimensional code display control table 122 shown in FIG. 8B, the CPU of the control unit 11 performs a display-change control. That is, the CPU of the control unit 11 gradually changes a two-dimensional code to be displayed on the display unit 13 from one arranged in lower layer to another arranged in an upper layer. Accordingly, it is possible to cause the size of the colored pattern contained in the cell to gradually become large or become small, or to change the shape of the colored pattern.

In this fashion, the CPU can cause a two-dimensional code displayed on the display unit 13 to represent predetermined information (e.g., a URL) by gradually making the size of the colored patterns larger and larger after a period t2 is elapsed from when the motion image of the character 15 is displayed on the display unit 13. At a timing t=t3, by gradually making the size of the colored patterns smaller and smaller after approximately one second is elapsed from when the size of the colored patterns becomes the largest size, it becomes possible to cause a two-dimensional code not to represent predetermined information.

That is, the two-dimensional code display system 10 has a state where only the motion image of the character 15 is displayed, and gradually displays a two-dimensional code from this state. Therefore, it is possible for the user to view the motion image of the character 15 with a good design characteristic.

Moreover, the two-dimensional code display system 10 can display a synthesis image as if the colored patterns are rotating by changing the shape of the colored pattern of the cell, thereby causing a two-dimensional code itself to have a good design characteristic.

Further, the two-dimensional code display system 10 maintains the size of the colored patterns of the two-dimensional code for about one second after the size of the colored patterns becomes maximum, and gradually makes the size thereof smaller and smaller, so that it is possible to provide a sufficient time for the user to read information from the two-dimensional code using a predetermined two-dimensional code reader.

As explained above, according to the two-dimensional code display system 10 of the second embodiment, it is possible to display the image of a character having a good design characteristic without deteriorating the readability of a two-dimensional code.

Third Embodiment

Figure 12:
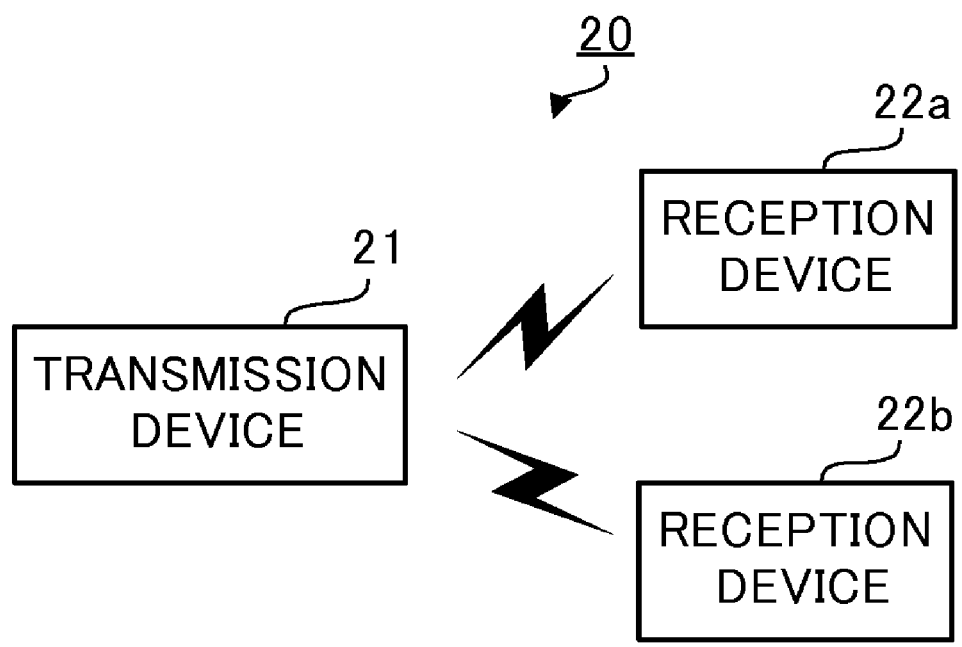
FIG. 12 is a block diagram showing the example structure of a two-dimensional code display system (television broadcasting system) according to the third embodiment of the present invention.

Next, an explanation will be given of the third embodiment of the present invention with reference to accompanying drawings. In the third embodiment, the two-dimensional code display system of the present invention is applied to a television broadcasting system. A television broadcasting system 20 is for realizing, for example, terrestrial digital broadcasting, BS (Broadcasting Satellite) digital broadcasting, CS (Communications Satellite) digital broadcasting, and as shown in FIG. 12, generally comprises a transmission device 21, a reception device 22a, and a reception device 22b.

Figure 13:
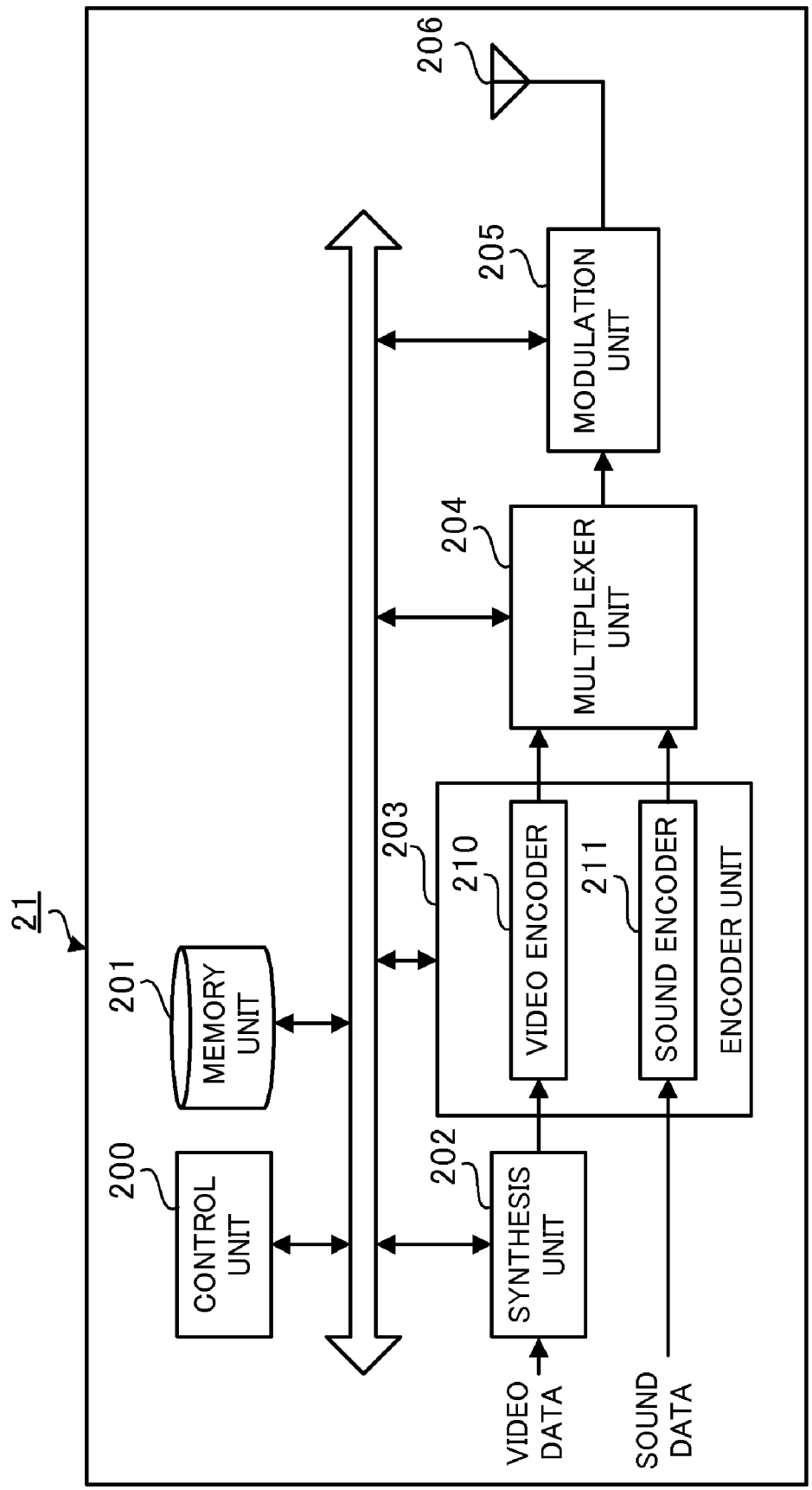
FIG. 13 is a block diagram showing the example structure of a transmission device in FIG. 12.

The transmission device 21 is a television broadcasting transmission device or the like provided at, for example, a television broadcasting station or the like, and as shown in FIG. 13, has a control unit 200, a memory unit 201, a synthesis unit 202, an encoder unit 203, a multiplexer unit 204, a modulation unit 205, an antenna 206, etc.

The control unit 200 comprises, e.g., a CPU (Central Processing Unit), a ROM (Read Only Memory), a RAM (Random Access Memory), a CTC (Counter/Timer Circuit), and the like. Every time an interruption request signal is input from the CTC, the CPU appropriately executes various programs stored in the ROM or the like using the RAM as a work memory, thereby controlling the operations of the individual units of the transmission device 21.

In the embodiment, in response to the updating of the value of a control timer (the control timer value) provided in, for example, the RAM, the CPU sequentially outputs video data, sound data, image data or the like corresponding to the updated control timer value.

The memory unit 201 comprises, for example, a hard disk drive. As shown in FIG. 14, image data of plural kinds of two-dimensional codes having aspect ratios from 1:1 to 1.33 . . . :1 (=4:3) and a timer determination value indicating a timing of reading out individual image data are registered in the memory unit 201 in association with each other.

In the embodiment, correspondingly to timer determination values t1 to t1+Δt, plural pieces of image data P(t1) to P(t1+Δt) of two-dimensional codes having an aspect ratio of 1:1 are registered in the memory unit 201. Moreover, regarding timer determination values t1+Δt to t4, plural pieces of image data P(t1+Δt) to P(t4) of two-dimensional codes having aspect ratios gradually becoming larger and larger from 1:1 to 1.33 . . . :1 as a timer determination value becomes large are registered in the memory unit 201. Further, correspondingly to timer determination values t4 to t4+Δt, plural pieces of image data P(t4) to P(t4+Δt) of two-dimensional codes having an aspect ratio of 1.33 . . . :1 are registered in the memory unit 201. Regarding timer determination values t4+Δt to t5, plural pieces of image data P(t4+Δt) to P(t5) of two-dimensional codes having aspect ratios gradually becoming smaller and smaller from 1.33 . . . :1 to 1:1 as a timer determination value becomes large are registered in the memory unit 201.

Let us suppose that a two-dimensional code of the third embodiment have the same structure (see FIG. 2) as those of the first and second embodiments.

Return to FIG. 13, the synthesis unit 202 synthesizes video data representing a video image having an aspect ratio of 16:9 with image data stored in the memory unit 201, and outputs a synthesized video image.

The encoder unit 203 comprises, for example, a video encoder 210 and a sound encoder 211. The encoder unit 203 performs compression coding on video data output from the synthesis unit 202 and sound data input under the control of the control unit 200 using the video encoder 210 and the sound encoder 211, respectively, and outputs coded data.

The multiplexer unit 204 multiplexes video data having undergone compression coding by the video encoder 210 and sound data having undergone compression coding by the sound encoder 211, and adds an error correcting code. Accordingly, the multiplexer unit 204 causes the bit streams of the video data and the sound data to be a packet, and creates and outputs a transport stream conforming to MPEG2 (Moving Picture Experts Group 2).

The modulation unit 205 performs digital modulation appropriate for each radio wave characteristic (e.g., OFDM (Orthogonal Frequency Division Multiplexing) modulation for a terrestrial digital broadcasting, 8PSK (8 Phase Shift Keying) modulation for BS digital broadcasting and CS digital broadcasting) on the transport stream output from the multiplexer unit 204, thereby creating and outputting a broadcasting signal.

The antenna 206 converts the broadcasting signal created by the modulation unit 205 into a radio wave, and outputs the radio wave, thereby broadcasting a program.

Figure 15:
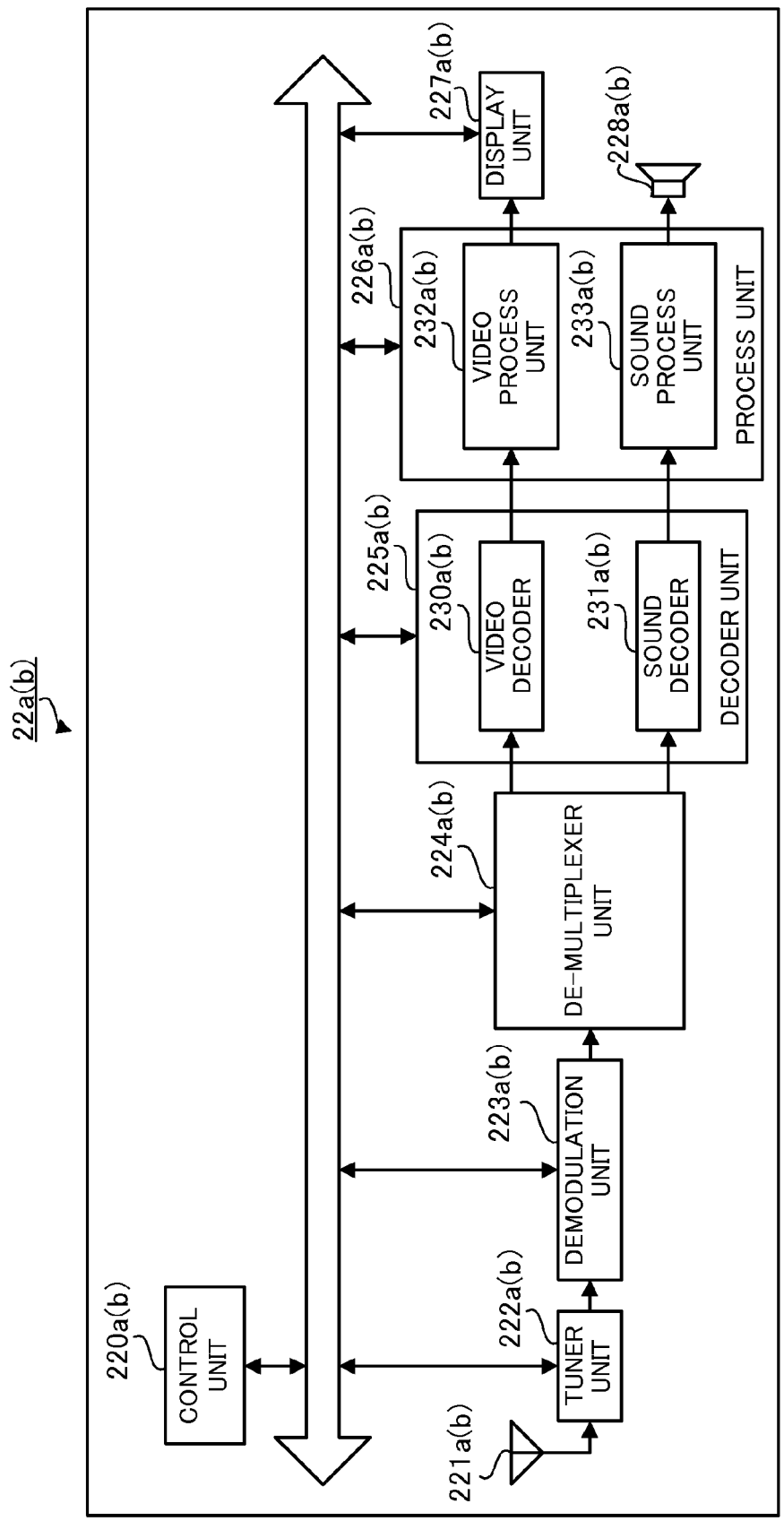
FIG. 15 is a block diagram showing the example structure of a reception device in FIG. 12.
Figure 18A:
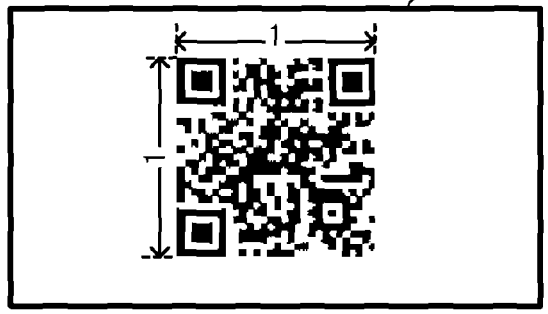
FIGS. 18A to 18H are (first) diagrams showing image display examples of a two-dimensional code displayed by the reception device in a modified embodiment of the third embodiment.
Figure 18E:
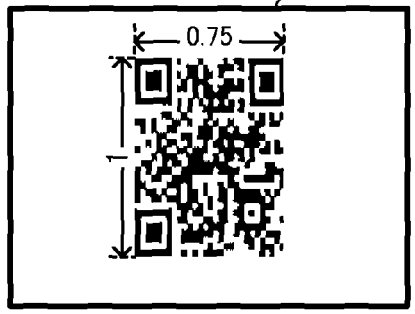
Figure 18B:
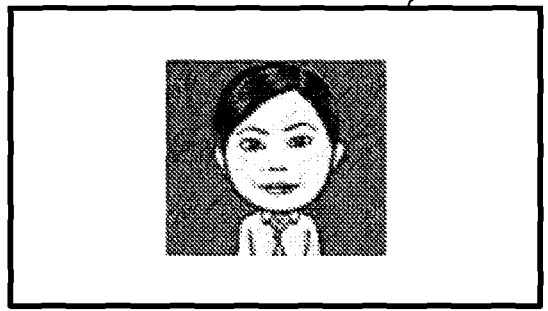
Figure 18F:
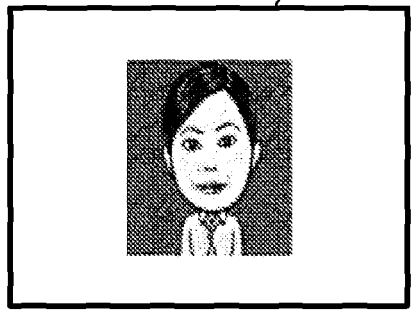
Figure 18C:
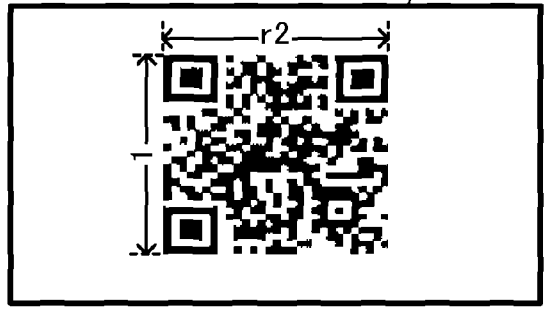
Figure 18G:
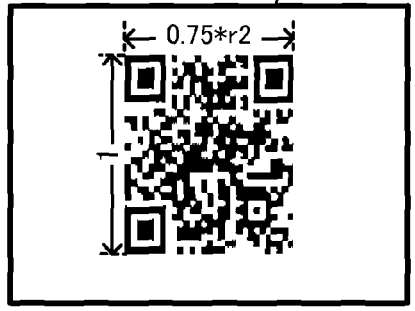
Figure 18D:
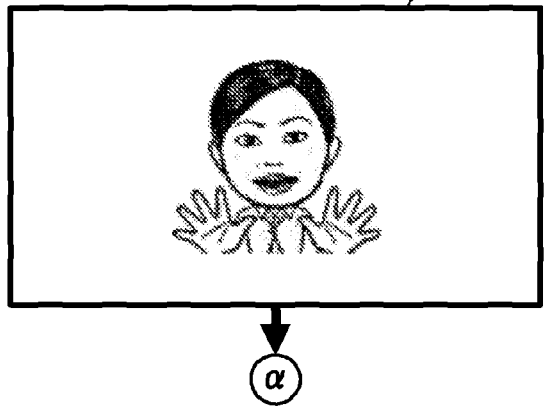
Figure 18H:
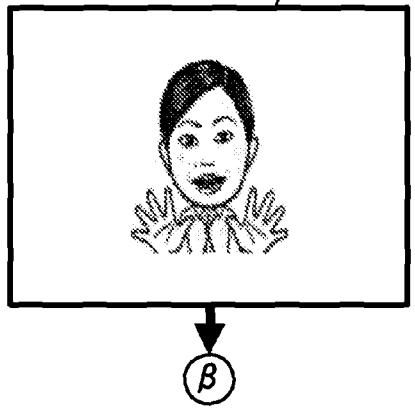
Figure 19A:
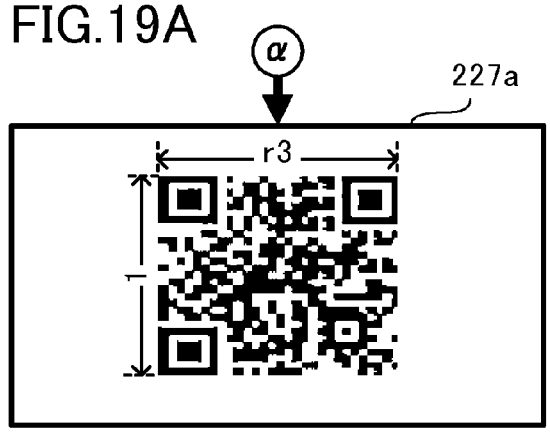
FIGS. 19A to 19F are (second) diagrams showing image display examples of a two-dimensional code displayed by the reception device in a modified embodiment of the third embodiment.
Figure 19B:
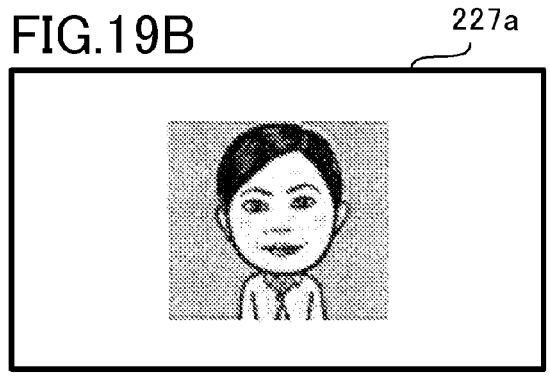
Figure 19C:
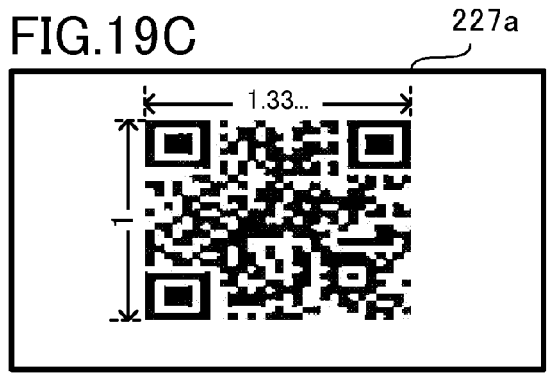
Figure 19D:
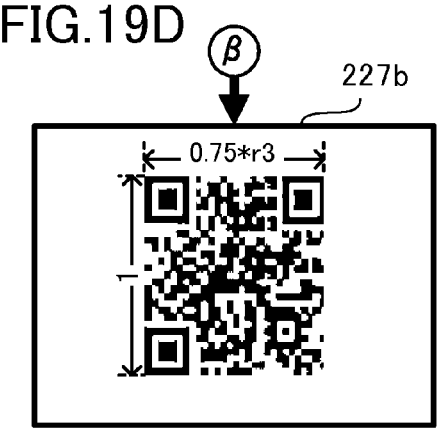
Figure 19E:
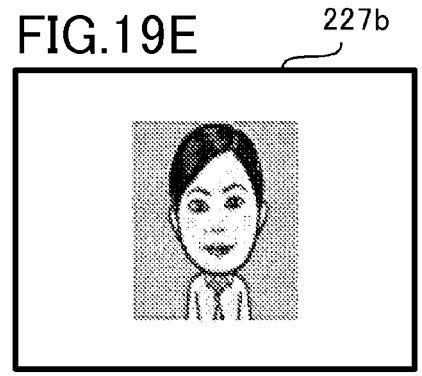
Figure 19F:
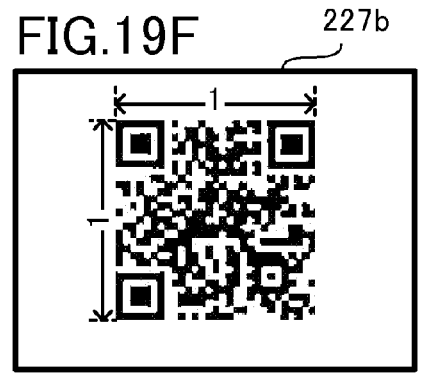

The reception device 22a, 22b is, for example, a household television broadcasting reception device, and as shown in FIG. 15, has a control unit 220a, 220b, an antenna 221a, 221b, a tuner unit 222a, 222b, a modulation unit 223a, 223b, de-multiplexer unit 224a, 224b, a decoder unit 225a, 225b, a process unit 226a, 226b, a display unit 227a, 227b, and a speaker 228a, 228b.

The control unit 220a, 220b comprises, for example, a CPU, a ROM, a RAM, and the like. The CPU appropriately executes various programs stored in the ROM or the like using the RAM as a work memory, thereby controlling operations of individual units of the reception device 22a, 22b.

The antenna 221a, 221b converts an externally-input radio wave into an electric signal, and outputs the electric signal.

The tuner unit 222a, 222b extracts, via the antenna 221a, 221b, respectively, an electric signal tuned to a frequency of a channel selected as an audience operates, for example, a remote controller from the electric signal input, thereby receiving a broadcasting signal transmitted from the transmission device 21 via a terrestrial tower, a BS broadcast satellite, a CS broadcast satellite, or the like.

The demodulation unit 223a, 223b performs, on the broadcasting signal received by the tuner 222a, 222b, respectively, digital demodulation appropriate for each kind of a radio wave characteristic (e.g., OFDM demodulation process for terrestrial digital broadcasting, 8PSK demodulation process for BS digital broadcasting or CS digital broadcasting), thereby converting the broadcasting signal into a transport stream, and outputs the transport stream.

The de-multiplexer unit 224a, 224b separates the transport stream converted by the demodulation unit 223a, 223b, respectively, into a video stream and a sound stream based on the packet ID (Identification Data) of the transport stream, and outputs the video stream and the sound stream.

The decoder 225a, 225b, respectively, comprises, for example, a video decoder 230a, 230b, a sound decoder 231a, 231b, and the like. The video decoder 230a, 230b performs decoding on the video stream output from the de-multiplexer unit 224a, 224b, respectively, thereby creating and outputting video data. The sound decoder 231a, 231b performs decoding on the sound stream output from the de-multiplexer unit 224a, 224b, thereby creating and outputting sound data.

The process unit 226a, 226b, respectively, comprises a video process unit 232a, 232b, and a sound process unit 233a, 233b. The video process unit 232a performs A/D (Analog/Digital) conversion on the video data output from the video decoder 230a, and outputs the converted data to the display unit 227a. The video process unit 232b performs a process of changing the aspect ratio from 16:9 to 4:3 on the video data output from the video decoder 230b, performs A/D conversion, and supplies the converted data to the display unit 227b. The sound process unit 233a, 233b performs A/D conversion on the sound data output from the sound decoder 231a, 231b, and supplies the converted data to the speaker 228a, 228b.

The display unit 227a, 227b comprises, for example, an LCD (Liquid Crystal Display) or the like.

The display unit 227a has a display screen having an aspect ratio of 16:9, and displays a video image based on the video data supplied from the video process unit 232a on the display screen, thereby displaying the video image of a program broadcasted from the transmission device 21 on the display screen as it is while maintaining the aspect ratio to 16:9. The display unit 227b has a display screen having an aspect ratio of 4:3, and displays a video image based on the video data supplied from the video process unit 232b on the display screen, thereby displaying the video image of a program broadcasted from the transmission device 21 on the display screen while changing the aspect ratio to 4:3.

The speaker 228a, 228b outputs a sound based on the sound data supplied from the sound process unit 233a, 233b, respectively.

Next, by referring to drawings, an explanation will be given of the specific operation of the television broadcasting system 20 having the foregoing structure.

At the transmission device side 21, as the CPU of the control unit 200 receives an interruption request signal output for every predetermined period (e.g., 33 ms) from the CTC and receives an interruption request, the CPU executes a predetermined timer interruption process. In the timer interruption process, as shown in FIG. 16, first, the CPU updates the control timer value (e.g., adds 1) provided in the RAM (step S301). Next, the CPU supplies video data corresponding to the updated control timer value to the synthesis unit 202, and supplies sound data to the sound encoder 211 (step S302).

Moreover, the CPU determines whether or not the updated timer value matches a timer determination value stored in the memory unit 201 (step S303). As a result, when the updated timer value does not match (step S303: NO), the CPU directly terminates the timer interruption process. Conversely, when it is determined that the updated control timer value matches the timer determination value (step S303: YES), the CPU reads out image data corresponding to the timer determination value from the memory unit 201, and supplies the image data to the synthesis unit 202 (step S304).

When only video data is supplied to the synthesis unit 202, the video data is directly supplied to the video encoder 210. In contrast, when image data is supplied in addition to video data, the synthesis unit 202 synthesizes the image data with the video data, and supplies the synthesized data to the video encoder 210.

The video data and the sound data supplied to the encoder unit 203 are subjected to compression coding by the video encoder 210 and the sound encoder 211, respectively. The data is multiplexed by the multiplexer unit 204, an error correction code is added to such data, and such data is converted into a transport stream conforming to MPEG2. Thereafter, the modulation unit 205 performs digital modulation on the transport stream to convert the transport stream into a broadcasting signal, and the broadcasting signal is output from the antenna 206.

Conversely, at the reception device 22a, 22b side, the tuner unit 222a, 222b, respectively, receives the broadcasting signal input via the antenna 221a, 221b. The demodulation unit 223a, 223b performs digital demodulation on the received broadcasting signal to convert the broadcasting signal into a transport stream conforming to MPEG2. The de-multiplexer unit 224a, 224b separates the transport stream into a video stream and a sound stream based on the packet ID of the transport stream. Thereafter, the video stream is demodulated by the video decoder 230a, 230b to be converted into video data, which is supplied to the video process unit 232a, 232b, respectively.

The video process unit 232a performs A/D conversion on the supplied video data, and supplies the converted data to the display unit 227a. Accordingly, a video image of a program broadcasted from the transmission device 21 is directly displayed on the display screen of the display unit 227a while maintaining the aspect ratio to 16:9. In contrast, the video process unit 232b performs a process of changing the aspect ratio from 16:9 to 4:3 on the supplied video data, performs A/D conversion on such data, and such data is supplied to the display unit 227b. Accordingly, a program broadcasted from the transmission device 21 is displayed on the display screen of the display unit 227b with the changed aspect ratio of 4:3.

Conversely, the sound stream is subjected to demodulation by each of the sound decoder 231a, 231b, and is converted into sound data. The converted sound data is subjected to A/D conversion by the sound process unit 233a, 233b, and is supplied to the speaker 228a, 228b, respectively. Accordingly, the speaker 228a, 228b outputs a sound based on the sound data.

Next, the two-dimensional code display process will be explained in more detail with reference to accompanying drawings.

First, during a period prior to a timing t1, in the transmission device 21, since a control timer value does not match any one of the timer determination values stored in the memory unit 201 (step S303: NO), the synthesis unit 202 does not synthesize image data of a two-dimensional code with video data. Accordingly, a video image having no image of a two-dimensional code is displayed on the display unit 227a (227b) of the reception device 22a (22b).

Thereafter, when it becomes the timing t1, since a control timer value matches a timer determination value t1 (step S303: YES), the synthesis unit 202 synthesizes image data P(t1) corresponding to the timer determination value t1 with video data. In this case, since a video image based on video data is displayed on the display screen of the display unit 227a of the reception device 22a while maintaining the aspect ratio to 16:9, as shown in FIG. 17A, the image of a two-dimensional code is displayed with an aspect ratio of 1:1. In contrast, since a video image based on the video data is displayed on the display screen of the display unit 227b of the reception device 22b with the aspect ratio being changed to 4:3, as shown in FIG. 17E, an image of the two-dimensional code is displayed with the aspect ratio being changed to 0.75:1.

Thereafter, during a period (e.g., 0.2 second) prior to a timing t1+Δt, image data of a two-dimensional code having an aspect ratio of 1:1 is synthesized with video data by the synthesis unit 202. Therefore, the display screen of the display unit 227a keeps displaying the image of the two-dimensional code while maintaining the aspect ratio to 1:1. In contrast, the display screen of the display unit 227b keeps displaying the image of two-dimensional code while maintaining the aspect ratio to 0.75:1.

During a period from the timing t1 to the timing t1+Δt, it is possible for the audience to read information represented by the two-dimensional code displayed on the display screen of the display unit 227a using a two-dimensional code reader of, for example, a cellular phone or the like. In contrast, it is difficult to accurately read information represented by the two-dimensional code displayed on the display screen of the display unit 227b.

After the timing t1+Δt, the synthesis unit 202 synthesizes respective plural pieces of image data of the two-dimensional code having an aspect ratio r (1<r<1.33):1 in an order of a smaller r with video image. Accordingly, a video image having the image of the two-dimensional code with an aspect ratio of r:1 is displayed on the display screen of the display unit 227a, and a video image having the image of the two-dimensional code with an aspect ratio of 0.75×r:1 is displayed on the display screen of the display unit 227b.

As an example, at a timing t2, since the synthesis unit 202 synthesizes image data P(t2) of the two-dimensional code having an aspect ratio of r2:1 with image data, as shown in FIG. 17B, the image of the two-dimensional code is displayed on the display screen of the display unit 227a with an aspect ratio of r2:1. Conversely, as shown in FIG. 17F, the image of the two-dimensional code is displayed on the display screen of the display unit 227b with an aspect ratio of 0.75×r2:1.

As another example, at a timing t3 (>t2), since the synthesis unit 202 synthesizes image data P(t3) of the two-dimensional code having an aspect ratio of r3 (>r2):1 with video data, as shown in FIG. 17C, the image of the two-dimensional code is displayed on the display screen of the display unit 227a with an aspect ratio of r3:1. Conversely, as shown in FIG. 17G, the image of the two-dimensional code is displayed on the display screen of the display unit 227b with an aspect ratio of 0.75×r3:1.

When it becomes a timing t4, since the synthesis unit 202 synthesizes image data P(t4) of the two-dimensional code having an aspect ratio of 1.33 . . . :1 with video data, as shown in FIG. 17D, the image of the two-dimensional code is displayed on the display screen of the display unit 227a with an aspect ratio of 1.33 . . . :1. Conversely, as shown in FIG. 17H, the image of the two-dimensional code is displayed on the display screen of the display unit 227b with an aspect ratio of 1 (=0.75×1.33 . . . ):1.

As explained above, during a period from the timing t1+Δt to the timing t4, the image of the two-dimensional code displayed on the display screen of the display unit 227a changes its shape to a landscape-oriented rectangle over time. In contrast, the image of the two-dimensional code displayed on the display screen of the display unit 227b changes its shapes from a portrait-oriented rectangle to a square over time.

Thereafter, during a period (e.g., 0.2 second) until it becomes a timing t4+Δt, since the synthesis unit 202 synthesizes image data of the two-dimensional code having an aspect ratio of 1.33 . . . :1 with video data, the display screen of the display unit 227a keeps displaying the image of the two-dimensional code while maintaining the aspect ratio to 1.33:1. Conversely, the display screen of the display unit 227b keeps displaying the image of the two-dimensional code while maintaining the aspect ratio to 1.1 . . . .

During such a period from the timing t4 to the timing t4+Δt, it is difficult to accurately read information represented by the two-dimensional code displayed on the display unit 227a using a two-dimensional code reader, but it becomes possible to read information represented by the two-dimensional code displayed on the display screen of the display unit 227*b*.

After the timing t4+Δt, the synthesis unit 202 sequentially synthesizes respective plural pieces of image data of the two-dimensional code having an aspect ratio r (1<r<1.33):1 in an order of a larger r with video data. Accordingly, a video image having the two-dimensional code with an aspect ratio of r:1 is displayed on the display screen of the display unit 227*a*. Conversely, a video image having the two-dimensional code with an aspect ratio of 0.75×r:1 is displayed on the display screen of the display unit 227*b*.

When it becomes a timing t5, since the synthesis unit 202 synthesizes image data P(t5) of the two-dimensional code having an aspect ratio of 1:1 with video data, like the timing t1, the image of the two-dimensional code is displayed on the display screen of the display unit 227*a* with an aspect ratio of 1:1. Conversely, the image of the two-dimensional code is displayed on the display screen of the display unit 227*b* with an aspect ratio of 0.75:1.

Thereafter, displaying carried out from a timing t5 to the timing t1 is repeated with such a period (e.g., 2 seconds) being as one cycle T (=t5−t1).

As explained above, according to the television broadcasting system 20 of the third embodiment, in the transmission device 21, the CPU of the control unit 200 supplies image data of the two-dimensional code having an aspect ratio of 1:1 to the synthesis unit 202 and causes the synthesis unit 202 to synthesize the image data with video data during a period from the timing t1 to the timing t1+Δt (e.g., 0.2 second). Accordingly, in the reception device 22*a*, a video image having the image of the two-dimensional code with an aspect ratio of 1:1 is displayed on the display screen of the display unit 227*a*. Conversely, a video image having the image of the two-dimensional code with an aspect ratio of 0.75:1 is displayed on the display screen of the display unit 227*b*.

Thereafter, the CPU of the control unit 200 causes the synthesis unit 202 to synthesize respective plural pieces of image data of the two-dimensional code with an aspect ratio r (1<r<1.33):1 with video data in an order of a smaller r during a period from the timing t1+Δt to the timing t4. Accordingly, in the reception device 22*a*, the image of the two-dimensional code contained in the video image displayed on the display screen of the display unit 227*a* has a changing aspect ratio, so that the shape of the two-dimensional code gradually changes its shape to a landscape-oriented rectangle from a square. Conversely, in the reception device 22*b*, the shape of the two-dimensional code displayed on the display screen of the display unit 227*b* gradually changes its shape to a square from a portrait-oriented rectangle.

The CPU of the control unit 200 supplies image data of the two-dimensional code having an aspect ratio of 1.33 . . . :1 to the synthesis unit 202 and causes the synthesis unit 202 to synthesize such image data with video data during a period (e.g., 0.2 second) from the timing t4 to the timing t4+Δt. Accordingly, in the reception device 22*b*, the image of the two-dimensional code having an aspect ratio of 1 (=0.75× 1.33 . . . ):1 is displayed on the display screen of the display unit 227*b*. Conversely, the image of the two-dimensional code having an aspect ratio of 1.33:1 is displayed on the display screen of the display unit 227*a*.

Accordingly, during a period from the timing t1 to the timing t1+Δt, it is possible to read information represented by the two-dimensional code displayed on the display screen of the display unit 227*a* having an aspect ratio of 16:9 using a two-dimensional code reader. Moreover, during a period from the timing t4 to the timing t4+Δt, it is possible to read information represented by the two-dimensional code displayed by the display screen of the display unit 227*b* having an aspect ratio of 4:3 using a two-dimensional code reader.

Thus, according to the television broadcasting system 20, it is possible to readably display the two-dimensional code on the display screen regardless of the aspect ratio of the display screen of the display unit of the reception device 22. As a result, it is possible to overcome a problem that an audience cannot read information represented by the displayed two-dimensional code using a two-dimensional code reader because of the specification relating to the aspect ratio of the reception device 22 of the audience.

Moreover, by displaying the image of the two-dimensional code having an aspect ratio of 1:1 on the display screen of the display unit 227*a*, 227*b* for a predetermined period (e.g., 0.2 second), it is possible to provide a sufficient time for the audience to read information from the two-dimensional code using a two-dimensional code reader.

The present invention is not limited to the foregoing individual embodiments, and can be changed and modified in various forms. Hereinafter, modified examples of the foregoing embodiments will be explained.

In the first embodiment, the explanation has been given of a case where an image alternately displayed with a two-dimensional code is the logo mark 6 corresponding to information represented by the two-dimensional code. The present invention is, however, not limited to this case, and such an image may be one representing the content of information represented by the two-dimensional code. For example, when information represented by the two-dimensional code is the content of a flight ticket, an image visibly representing the content thereof may be alternately displayed on the display unit 4 with the two-dimensional code.

In the first embodiment, an image alternately displayed with a two-dimensional code may be one which is not directly related to information represented by the two-dimensional code, and for example, may be an advertisement image of an advertiser. Further, an image alternately displayed with a two-dimensional code is not limited to a still image, and may be a motion image.

In the second embodiment, the explanation has been given of the case where the motion image of the character 15 is displayed on the display unit 13 by gradually changing images displayed on the display unit 13 to still images based on image data arranged in upper layers. The present invention is, however, not limited to this case, and the motion image of the motion image of the character 15 may be displayed on the display unit 13 based on motion image data in MPEG (Moving Picture Experts Group) format.

In the second embodiment, an image synthesized with a two-dimensional code and displayed may not be a motion image, and may be a still image.

In the third embodiment, the explanation has been given of the example case where the display screens have an aspect ratio of 16:9 and an aspect ratio of 4:3, respectively, but the present invention is not limited to this case, and can be applied to a display screen having any aspect ratio. More specifically, the present invention can be applied to a display screen having an aspect ratio used for a movie, such as a standard size (aspect ratio: 1.37:1), a vista size (aspect ratio: 1.85:1), or a cinema scope size (aspect ratio: 2.35:1).

For example, in order to set a two-dimensional code displayed on the display screen having a cinema scope size to be readable, the aspect ratio of a two-dimensional code contained in a video image having an aspect ratio of 16:9 may be changed from 1:1 to 0.76 . . . :1. Further, in order to set a two-dimensional code to be readable through a display screen having an aspect ratio of 4:3, the aspect ratio of the image of the two-dimensional code contained in a video image having an aspect ratio of 16:9 may be changed from 1:1.33 . . . to 0.76 . . . :1. In this case, when the aspect ratio of the image of the two-dimensional code contained in the video image having an aspect ratio of 16:9 becomes 1:1.33 . . . , 1:1, 0.76 . . . :1, the image of the two-dimensional code may be kept displaying for a predetermined period (e.g., 0.2 second).

In the foregoing third embodiment, for example, a video image containing a two-dimensional code and a video image containing an image other than the two-dimensional code (e.g., a character or a letter) may be alternately displayed on the display screen of the display unit 227a (227b) while gradually changing the aspect ratio (see FIGS. 18A to 18H and 19A to 19F). In this case, image data of the two-dimensional code and an image other than the two-dimensional code may be alternately supplied to the synthesis unit 202 for every predetermined period to synthesize such image or image data with a video data.

This improves the design characteristic when the image of the two-dimensional code is displayed on the display screen of the display unit 227a (227b). Moreover, when a video image containing the image of the two-dimensional code is displayed on the display screen of the display unit 227a (227b), as predetermined sound data is synthesized with sound data of a program in the transmission device 21, a predetermined sound other than the sound of the program may be output from the speaker 228a (228b) of the reception device 22a (22b).

In the foregoing third embodiment, the explanation has been given of an example case where the two-dimensional code display system is the television broadcasting system in which video data synthesized with image data of a two-dimensional code is converted into a radio wave and distributed, but the present invention is not limited to this case. For example, the present invention can be applied to the Internet broadcasting in which video image or the like is superimposed on a carrier wave and broadcasted via a network. Further, a DVD (Digital Versatile Disc)-Rom or the like storing video data synthesized with image data of a two-dimensional code may be reproduced by a reproduction device and a video image containing the image of the two-dimensional code may be displayed on the display screen of the display unit 227a (227b).

Figure 20:
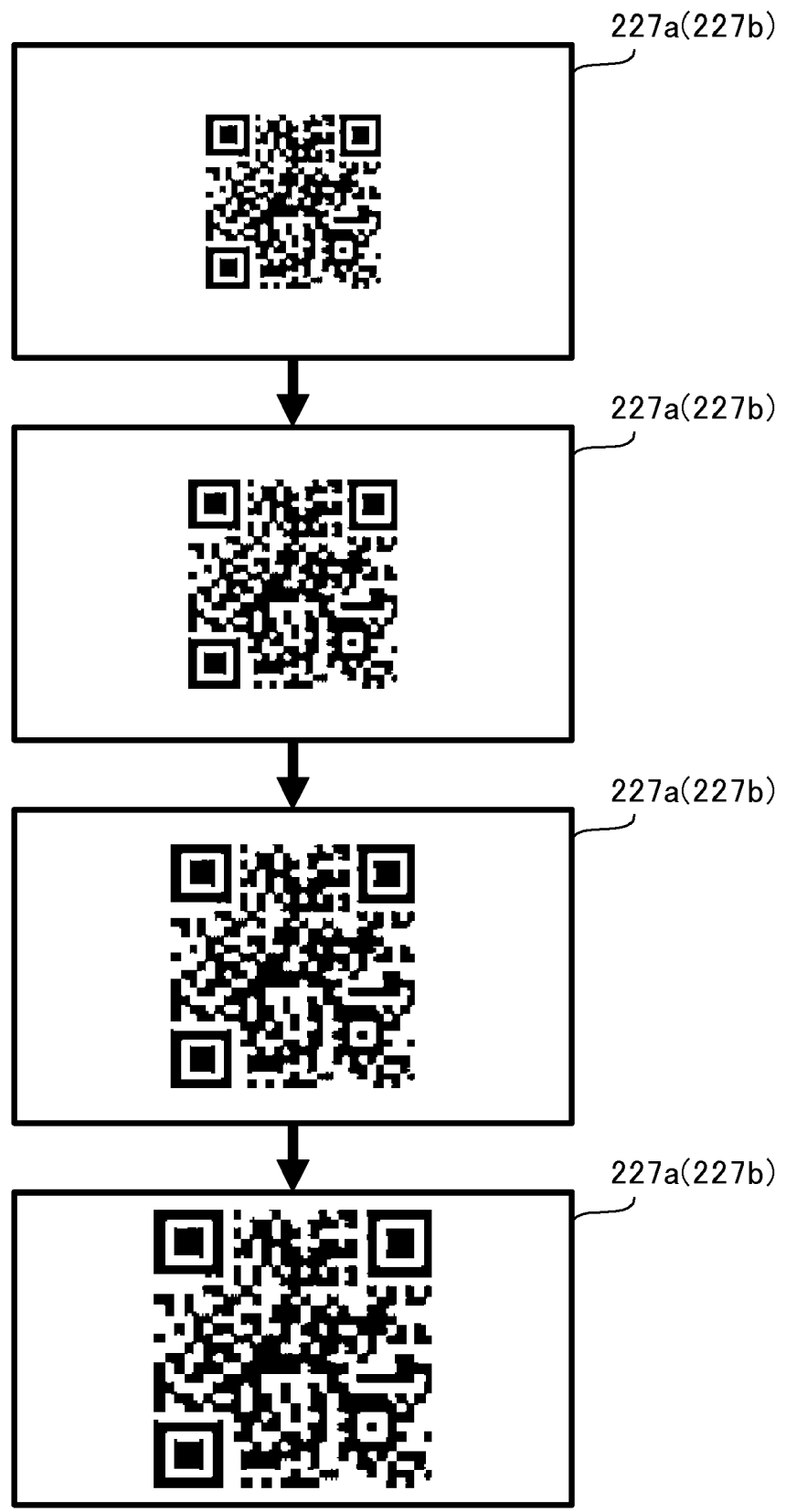
FIG. 20 is a (third) diagram showing image display examples of a two-dimensional code displayed by the reception device in a modified embodiment of the third embodiment.

In the third embodiment, when the reception device 22a (22b) displays the image of a two-dimensional code with an aspect ratio of 1:1, the transmission device 21 may perform controlling in such a way that the size of the image of the two-dimensional code gradually changes. More specifically, when the image of the two-dimensional code is displayed with an aspect ratio of 1:1 at either one of the reception device 22a or the reception device 22b, the control unit 200 of the transmission device 21 increases the size of the image of the two-dimensional code to be synthesized with video data step by step. Accordingly, as shown in FIG. 20, at the reception device 22a (22b), the image of the two-dimensional code gradually increases its size. When the size of the two-dimensional code becomes the maximum size set beforehand, the control unit 200 reduces the size of the image of the two-dimensional code to be synthesized with video image step by step. The control unit 200 repeats such control (image size small→large→small) of changing the size of the image of the two-dimensional code by predetermined times. This facilitates reading of the two-dimensional code regardless of the screen size of a video image output device like a television broadcasting reception device that a user (audience or the like) has. That is, it is not necessary for the user to put a two-dimensional code reader close to the screen of the video image output device, or to take any action such that the user himself/herself comes close to the video image output device, and it becomes possible for the user to read information from the displayed two-dimensional code. Note that when the size of the image of the two-dimensional code is gradually changed, the control unit 200 of the transmission device 21 may cut in an image other than the two-dimensional code (e.g., a character or a letter) regularly or randomly.

Figure 21:
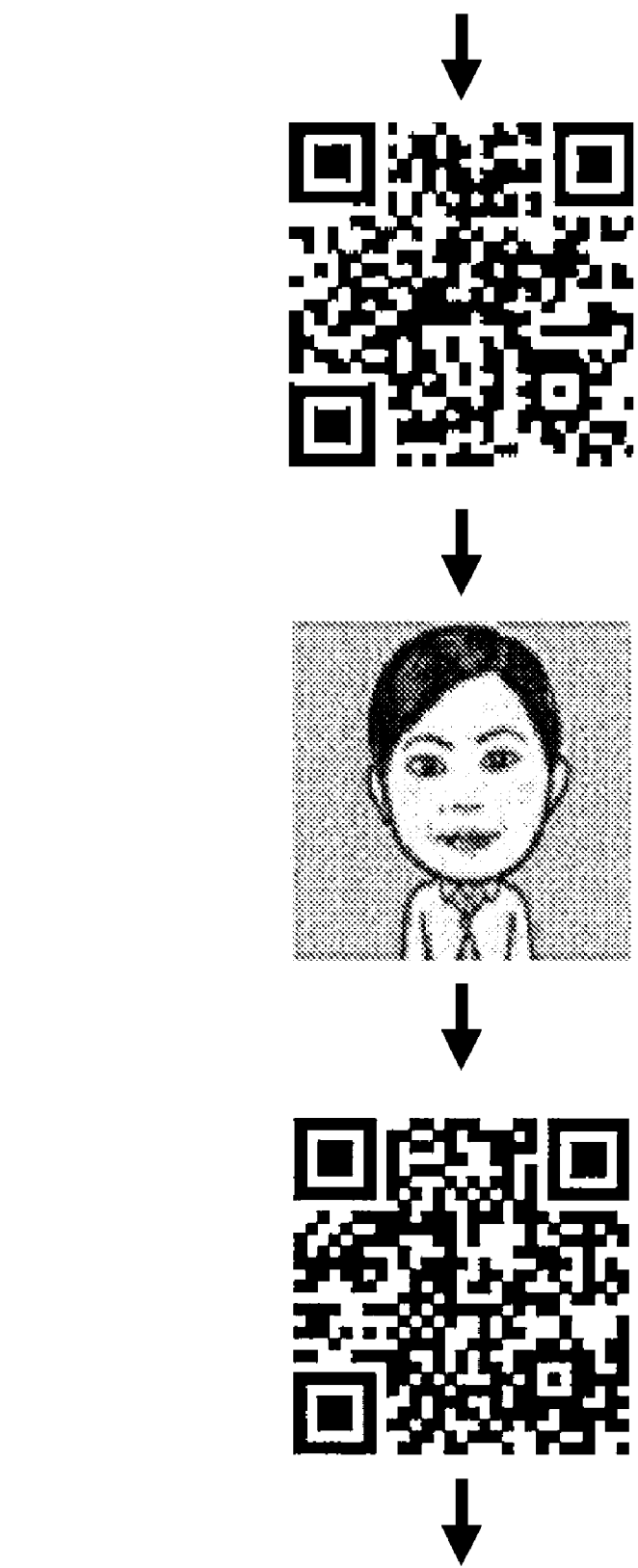
FIG. 21 is a diagram showing image display examples of a two-dimensional code displayed by display means in another embodiment.

The control unit 2 of the two-dimensional code display system 1, the control unit 11 of the two-dimensional code display system 10, and the control unit 200 of the transmission device 21 in the television broadcasting system 20 may perform a control in such a way that plural kinds of two-dimensional codes, each representing information having a different content, are sequentially changed and displayed individually on the display unit 4, 13, and the display unit 227a (227b) of the reception device 22a (22b). At this time, as shown in FIG. 21, an image other than the two-dimensional code may be cut in regularly or randomly.

Although the explanation has been given of the case where the program executed by each CPU of the control unit 2 of the two-dimensional code display system 1, the control unit 11 of the two-dimensional code display system 10, and the control unit 200 of the transmission device 21 in the television broadcasting system 20 is stored in the ROM, the memory unit 3, 12, or the like beforehand, the present invention is not limited to this case. For example, a program for executing the foregoing operation may be applied to a conventional general-purpose computer to allow such computer to function as the two-dimensional code display system 1, 10 or the television broadcasting system 20 of the foregoing embodiment.

How to provide such a program is optional, and for example, such a program may be stored in a computer-readable recording medium (flexible disk, CD (Compact Disc)-ROM, DVD (Digital Versatile Disc)-ROM, or the like) and the recording medium may be distribute to provide such a program, or such a program may be stored in a storage over a network like the Internet, and may be downloaded.

When the foregoing process is sheared by an OS and an application program or is executed by the cooperation of the OS and the application program, only the application program may be stored in a recording medium or a storage, and the program may be superimposed on a carrier wave and distributed over a network. For example, the program may be posted on a BBS (Bulletin Board System) over a network, and distributed over the network. By running the program and executing the program under the control of the OS like the other application programs, the foregoing process can be executed.

INDUSTRIAL APPLICABILITY

The present invention can be applied to various technologies related to display of a two-dimensional code.

The invention claimed is:
1. A two-dimensional code display system comprising:
a display unit which is capable of displaying a two-dimensional code representing predetermined information by plurality of cells arranged in a matrix; and
a display control unit for changing a display form of the two-dimensional code, wherein
the display control unit controls the display unit to intermittently and visibly display the two-dimensional code, and controls the display unit to visibly display a predetermined image while the two-dimensional code is not displayed, the predetermined image being different form a two-dimensional code.

2. The two-dimensional code display system according to claim 1, wherein the display control unit repeats a control of changing the display of the display unit to the two-dimensional code after a first period elapses since the display unit starts displaying the predetermined image, and a control of changing the display of the display unit to the predetermined image after a second period elapses since the display unit starts displaying the two-dimensional code.

3. The two-dimensional code display system according to claim 1, wherein the display control unit controls the display unit to sequentially change and display plural two-dimensional codes each representing information having a different content.

4. The two-dimensional code display system according to claim 1, wherein the display control unit controls the display unit to display an image while the two-dimensional code is not displayed, the image visibly representing a content of the information represented by the two-dimensional code.

5. A two-dimensional code display method for controlling a display unit to display a two-dimensional code representing predetermined information by a plurality of cells arranged in a matrix, the method comprising:
a display control step of changing a display form of the two-dimensional code, wherein
in the display control step, the display unit is controlled to intermittently and visibly display the two-dimensional code and to visibly display a predetermined image while the two-dimensional code is not displayed, the predetermined image being different from a two-dimensional code.

6. The two-dimensional code display method according to claim 5, wherein in the display control step, the display unit is controlled to sequentially change and display plural two-dimensional codes each representing information having a different content.

7. The two-dimensional code display method according to claim 5, wherein in the display control step, the display unit is controlled to display an image while the two-dimensional code is not displayed, the image visibly representing a content of the information represented by the two-dimensional code.

8. A non-transitory computer-readable recording medium recording a program that allows a computer to function as:
display control means for changing a display form of a two-dimensional code when a display unit is controlled to display the two-dimensional code, the two-dimensional code representing predetermined information by a plurality of cells arranged in a matrix, wherein
the display control means controls the display unit to intermittently and visibly display the two-dimensional code, and controls the display unit to visibly display a predetermined image while the two-dimensional code is not displayed, the predetermined image being different from a two-dimensional code.

9. The non-transitory computer-readable recording medium recording a program according to claim 8, wherein the display control means controls the display unit to sequentially change and display plural two-dimensional codes each representing information having a different content.

10. The non-transitory computer-readable recording medium recording a program according to claim 8, wherein the display control means controls the display unit to display an image while the two-dimensional code is not displayed, the image visibly representing a content of the information represented by the two-dimensional code.

* * * * *